(12) United States Patent
Huang et al.

(10) Patent No.: US 9,031,797 B2
(45) Date of Patent: May 12, 2015

(54) MULTIPHASE FLOW MEASUREMENT

(75) Inventors: Songming Huang, Hardwick (GB);
Cheng-Gang Xie, Sawston (GB); Ian Atkinson, Ely (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 886 days.

(21) Appl. No.: 12/672,531

(22) PCT Filed: Sep. 17, 2008

(86) PCT No.: PCT/GB2008/003139
§ 371 (c)(1),
(2), (4) Date: Jan. 13, 2011

(87) PCT Pub. No.: WO2009/037435
PCT Pub. Date: Mar. 26, 2009

(65) Prior Publication Data
US 2011/0098938 A1    Apr. 28, 2011

Related U.S. Application Data

(60) Provisional application No. 60/973,362, filed on Sep. 18, 2007.

(51) Int. Cl.
*G01F 1/66* (2006.01)
*G01F 1/74* (2006.01)
(Continued)

(52) U.S. Cl.
CPC .. *G01F 1/74* (2013.01); *G01F 3/30* (2013.01); *G01F 1/7082* (2013.01); *G01F 1/663* (2013.01); *G01F 1/667* (2013.01)

(58) Field of Classification Search
CPC ....... G01F 1/7082; G01F 1/708; G01F 1/668; G01F 3/30; G01F 1/663; G01F 1/667; G01F 1/74

USPC ................................ 702/25, 24, 48
See application file for complete search history.

(56) References Cited

U.S. PATENT DOCUMENTS 3,938,738 A    2/1976    Nagel et al.
4,044,943 A    8/1977    Brown et al.
(Continued)

FOREIGN PATENT DOCUMENTS

EP    0076882 A1    4/1983
EP    0254160 A1    1/1988
(Continued)

OTHER PUBLICATIONS

Asher: "Aerosols", Ultrasonic Sensors for Chemical and Process Plant, Sensors Series, Institute of Physics Publishing, Bristol and Philadelphia, 1997, p. 351, Section A.5.7.
(Continued)

*Primary Examiner* — Jonathan C Teixeira Moffat
*Assistant Examiner* — Liam R Casey
(74) *Attorney, Agent, or Firm* — Cameron R. Sneddon

(57) ABSTRACT

Methods and systems are described that provide for measuring flow properties of multiphase mixtures within a pipe carry gas-liquid hydrocarbons and water produced from oil-gas wells. The methods and systems may provide for a combination of a clamp-on ultrasonic gas flow meter to measure flow characteristics of a gas phase in a pipeline and a pulsed ultrasonic Doppler sensor(s) and/or an RF/microwave electromagnetic sensor(s) to measure flow characteristics of a liquid phase. The combination of sensors may provide for multiphase flow measurements under certain flow conditions, such as when the gas-liquid is flowing in a substantially horizontal pipeline, when the flow is stratified or is caused to be stratified and/or the like.

19 Claims, 14 Drawing Sheets

(51) Int. Cl.
*G01F 3/30* (2006.01)
*G01F 1/708* (2006.01)

(56) References Cited

U.S. PATENT DOCUMENTS

| | | | |
|---|---|---|---|
| 4,232,549 A | 11/1980 | Migrin et al. | |
| 4,282,751 A | 8/1981 | Brown et al. | |
| 4,312,234 A | 1/1982 | Rhodes et al. | |
| 4,467,659 A | 8/1984 | Baumoel | |
| 4,787,252 A * | 11/1988 | Jacobson et al. | 73/861.28 |
| 4,829,831 A | 5/1989 | Kefer et al. | |
| 4,856,344 A | 8/1989 | Hunt | |
| 5,007,293 A | 4/1991 | Jung | |
| 5,203,211 A | 4/1993 | Jung | |
| 5,251,490 A | 10/1993 | Kronberg | |
| 5,287,752 A | 2/1994 | Den Boer | |
| 5,396,807 A | 3/1995 | Dowty et al. | |
| 5,400,657 A | 3/1995 | Kolpak et al. | |
| 5,463,906 A | 11/1995 | Spani et al. | |
| 5,485,743 A | 1/1996 | Taherian et al. | |
| 5,501,099 A | 3/1996 | Whorff | |
| 5,591,922 A | 1/1997 | Segeral et al. | |
| 5,654,502 A | 8/1997 | Dutton | |
| 5,693,891 A | 12/1997 | Brown et al. | |
| 5,719,329 A * | 2/1998 | Jepson et al. | 73/61.49 |
| 5,793,216 A | 8/1998 | Constant | |
| 5,905,208 A | 5/1999 | Ortiz et al. | |
| 6,058,787 A | 5/2000 | Hughes | |
| 6,284,023 B1 | 9/2001 | Torkildsen et al. | |
| 6,386,018 B1 * | 5/2002 | Letton et al. | 73/61.79 |
| 6,550,345 B1 * | 4/2003 | Letton | 73/861.27 |
| 6,575,043 B1 | 6/2003 | Huang et al. | |
| 6,622,574 B2 | 9/2003 | Fincke | |
| 6,655,221 B1 | 12/2003 | Aspelund et al. | |
| 6,719,048 B1 | 4/2004 | Ramos et al. | |
| 6,758,100 B2 | 7/2004 | Huang | |
| 6,776,054 B1 | 8/2004 | Stephenson et al. | |
| 6,831,470 B2 | 12/2004 | Xie et al. | |
| 7,327,146 B2 | 2/2008 | Simon | |
| 7,454,981 B2 | 11/2008 | Gysling | |
| 7,562,587 B2 | 7/2009 | Atkinson et al. | |
| 7,607,358 B2 | 10/2009 | Atkinson et al. | |
| 7,617,055 B2 * | 11/2009 | Henry et al. | 702/48 |
| 7,650,799 B2 | 1/2010 | Atkinson et al. | |
| 7,673,525 B2 | 3/2010 | Huang | |
| 7,908,930 B2 | 3/2011 | Xie et al. | |
| 7,987,733 B2 | 8/2011 | Atkinson et al. | |
| 8,027,794 B2 | 9/2011 | Xie | |
| 2002/0011120 A1 * | 1/2002 | Huang | 73/861.25 |
| 2005/0229716 A1 | 10/2005 | Unsworth et al. | |
| 2006/0145709 A1 * | 7/2006 | Bentolila et al. | 324/717 |
| 2007/0006744 A1 * | 1/2007 | Gysling | 99/486 |
| 2007/0157737 A1 | 7/2007 | Gysling et al. | |
| 2007/0294039 A1 * | 12/2007 | Gysling | 702/24 |
| 2008/0319685 A1 * | 12/2008 | Xie et al. | 702/45 |
| 2010/0224009 A1 * | 9/2010 | Steven | 73/861.42 |
| 2010/0299088 A1 | 11/2010 | Huang et al. | |
| 2011/0112773 A1 | 5/2011 | Atkinson | |

FOREIGN PATENT DOCUMENTS

| | | | |
|---|---|---|---|
| GB | 1217579 | | 12/1970 |
| GB | 2152213 | A | 7/1985 |
| GB | 2177803 | A | 1/1987 |
| GB | 2238615 | A | 6/1991 |
| GB | 2279146 | A | 12/1994 |
| GB | 2300265 | A | 10/1996 |
| GB | 2325736 | A | 12/1998 |
| GB | 2343249 | A | 5/2000 |
| GB | 2343249 | B | 1/2001 |
| GB | 2363455 | A | 12/2001 |
| GB | 2359435 | B | 5/2002 |
| GB | 2363455 | B | 10/2002 |
| GB | 2376074 | A | 12/2002 |
| GB | 2406386 | A | 3/2005 |
| GB | 2420299 | A | 5/2006 |
| GB | 2447490 | A | 5/2009 |
| GB | 2454256 | A | 5/2009 |
| SU | 1337667 | A1 | 9/1987 |
| WO | 8902066 | A1 | 3/1989 |
| WO | 9108444 | A1 | 6/1991 |
| WO | 9533980 | A1 | 12/1995 |
| WO | 9724585 | A1 | 7/1997 |
| WO | 0003207 | A1 | 1/2000 |
| WO | 0123845 | A1 | 4/2001 |
| WO | 2004106861 | A2 | 12/2004 |
| WO | 2005031311 | A1 | 4/2005 |
| WO | 2005040732 | A1 | 5/2005 |
| WO | 2007105961 | A1 | 9/2007 |
| WO | 2007129897 | A1 | 11/2007 |
| WO | 2008029025 | A1 | 3/2008 |
| WO | 2008084182 | A1 | 7/2008 |
| WO | 2008110805 | A1 | 9/2008 |
| WO | 2009037434 | A1 | 3/2009 |
| WO | 2009056841 | A1 | 5/2009 |
| WO | 2009112834 | A1 | 9/2009 |

OTHER PUBLICATIONS

Asher: "Attenuation in two-phase fluid systems", Ultrasonic Sensors for Chemical and Process Plant, Sensors Series, Institute of Physics Publishing, Bristol and Philadelphia, 1997, pp. 365-373, Section B.6.

Atkinson et al.: "New generation multiphase flowmeters from Schlumberger and Framo Engineering AS", 17th International North Sea Flow Measurement Workshop, Oslo, Norway, Oct. 25-28, 1999.

Batchelor: "Steady axisymmetric flow with swirl", An Introduction to Fluid Dynamics, Cambridge University Press, 2000, section 7.5, pp. 543-555.

Beckman: "Wetter isn't better", Flow Meter Directory, article reference ARTC02022401 submitted by INEEL Research Communications on Feb. 24, 2002. Internet link: http://www.flowmeterdirectory.com/flowmeter_artc_02022401.html [Information printed on Feb. 20, 2012].

Bondet De La Bernardie et al.: "Low (10-800 MHz) and high (40 GHz) frequency probes applied to petroleum multiphase flow characterization", Measurement Science and Technology, vol. 19, 2008, pp. 1-8.

Clark: "Liquid film thickness measurement", Multiphase Science and Technology, vol. 14, No. 1, 2002, pp. 1-74.

Constant et al.: "Multiphase metering using ultrasonics as an alternative approach", Documentation of Multiphase Metering Conference, Mar. 12-13, 1997, The Airport Skean Hotel, Aberdeen, Organised by IBC Technical Services Ltd.

Emerson Electric Company: "Daniel Senior Sonic™ 4-Path Gas Flow Meter", Emerson Process Management, product information. Internet link: http://www2.emersonprocess.com/en-US/brands/daniel/Flow/ultrasonics/Pages/Ultrasonic.aspx. Copyright 2011 Emerson Electric Company. [Information printed on Feb. 20, 2012].

Falcone et al.: "ANUMET—a novel wet gas flowmeter", SPE Annual Technical Conference and Exhibition, Denver, Colorado, Oct. 5-8, 2003, SPE 84504.

Folgerø et al.: "Permittivity measurement of thin liquid layers using open-ended coaxial probes", Measurement Science and Technology, vol. 7, 1996, pp. 1164-1173.

Fryer et al.: "The effect of swirl on the liquid distribution in annular two-phase flow" International Journal of Multiphase Flow, vol. 8, 1982, pp. 285-289.

General Electric Company: "TransPort PT878GC—Portable Gas Ultrasonic Flowmeter", GE Measurement & Control, product information. Internet link: http://www.ge-mcs.com/en/flow/ultrasonic-clamp-on-gas-/transport-pt878gc.html. Copyright 2012 General Electric Company. [Information printed on Feb. 16, 2012].

Gibson et al.: "Keynote paper—swirling flow through Venturi tubes of convergent angle 10.5° and 21°", Proceedings of FEDSM2006, 2006 ASME Joint U.S.—European Fluids Engineering Summer Meeting, Miami, Florida, Jul. 17-20, 2006, FEDSM2006-98229.

Greenwood et al.: "Self-calibrating sensor for measuring density through stainless steel pipeline wall", Journal of Fluids Engineering, vol. 126, 2004, pp. 189-192.

(56) References Cited

OTHER PUBLICATIONS

Gudmundsson et al.: "Gas-liquid metering using pressure-pulse technology", SPE Annual Technical Conference and Exhibition, Houston, Texas, Oct. 3-6, 1999, SPE 56584.

Gunarathne et al.: "Novel techniques for monitoring and enhancing dissolution of mineral deposits in petroleum pipelines", Offshore Europe Conference, Aberdeen, Sep. 5-8, 1995, SPE 30418.

Hammer: "Flow permittivity models and their application in multiphase meters", Proceedings of Multiphase Metering, IBC Technical Services, Aberdeen Mar. 12-13, 1997.

Hayman et al.: "High-resolution cementation and corrosion imaging by ultrasound", SPWLA 32nd Annual Logging Symposium, Midland, TX, USA, Jul. 16-19, 1991, paper KK.

Lynnworth: "Level of liquids and solids", Ultrasonic measurements for process control. Theory, techniques, applications, Academic Press, 1989, chapter 2, section 2.4.3, pp. 58-63.

Lynnworth: "Ultrasonic measurements for process control. Theory, techniques, applications", Academic Press, 1989, pp. 23-27, 30, 32-35, 254-255, 312-317.

McCrometer: "V-Cone Flow Meter. The versatile solution", product information, McCrometer, Inc., 3255 West Stetson Avenue, Hemet, CA 92545, USA. Internet link: http://www.mccrometer.com/products/product_vcone.asp Copyright 2006-2011 McCrometer, Inc. [Information printed on Feb. 20, 2012].

Signal Processing: "DOP2000", Velocimeters, product information, Signal Processing SA, 6 chemin du Cret Rouge, 1073 Savigny, Switzerland. Internet link: http://www.signal-processing.com/velocimeters.html [Information printed on Feb. 16, 2012].

Solartron ISA: "Dualstream 1 Topside", Oil and Gas Measurement Solutions, product information, Solartron ISA, Hackworth Industrial Park, Shildon, Country Durham DL4 1LH, United Kingdom. Internet link: http://www.solartronisa.com/downloads/dualstream1-topside.pdf Copyright 2006 Ametek, Inc. [Information printed on Feb. 20, 2012].

Takeda: "Velocity profile measurement by ultrasound Doppler shift method", Int. J. Heat & Fluid Flow, vol. 7, No. 4, 1986, pp. 313-318.

Theron et al.: "Stratified flow model and interpretation in horizontal wells", SPE Annual Technical Conference and Exhibition, Denver, Colorado, Oct. 6-9, 1996, SPE 36560.

Willemetz et al.: "Instantaneous Doppler frequency measurement and implementation in a multigate flowmeter", EUROSON 87, Helsinki, Finland, Jun. 14-18, 1987.

Xie: "Measurement of multiphase flow water fraction and water-cut", American Institute of Physics Conference Proceedings, Jun. 5, 2007, vol. 914, pp. 232-239. Proc. 5th Int. Symp. on Measurement Techniques for Multiphase Flows (5th ISMTMF, Dec. 11-14, 2006, Macau, China.

Yuxing et al.: "A new type of wet gas online flow meter based on dual slotted orifice plate", 7th International Symposium on Instrumentation and Control Technology: Sensors and Instruments, Computer Simulation, and Artificial Intelligence, Proceedings of SPIE, vol. 7127, 2008, pp. 1-12.

\* cited by examiner

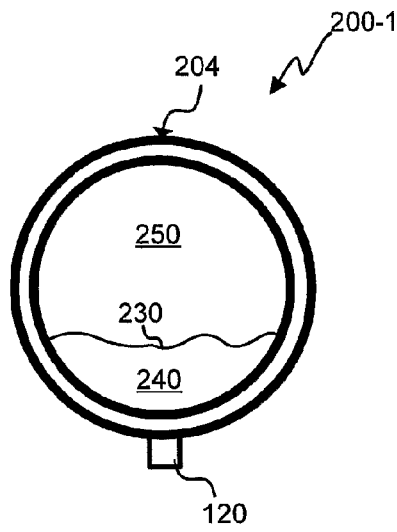
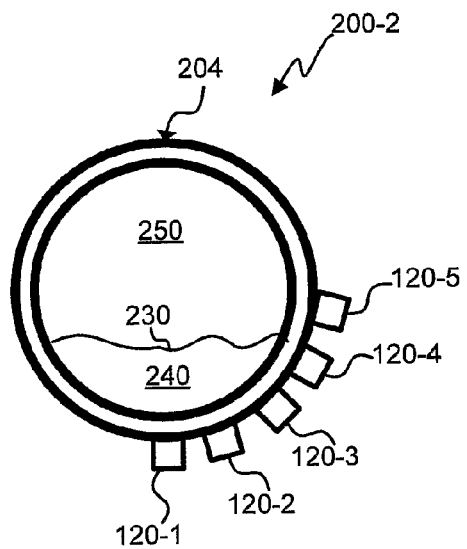
FIG. 4A                FIG. 4B
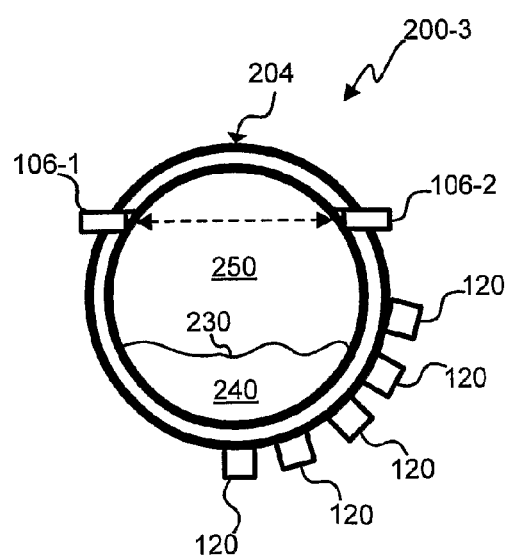
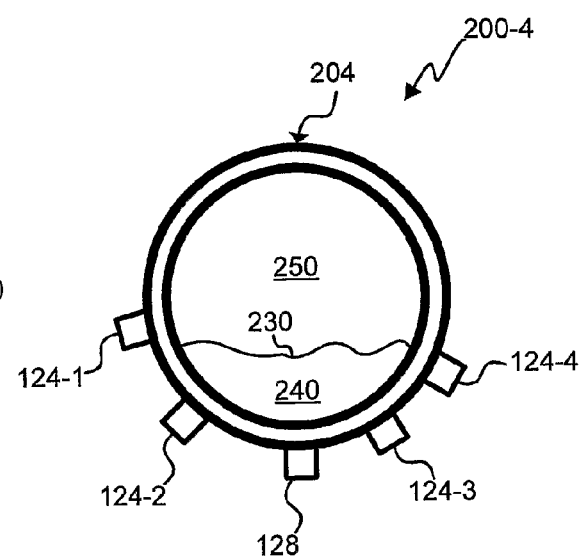
FIG. 4C                FIG. 4D

MULTIPHASE FLOW MEASUREMENT

This application claims the benefit of and is a non-provisional of U.S. Provisional Application Ser. No. 60/973,362 filed on Sep. 18, 2007, which is hereby expressly incorporated by reference in its entirety for all purposes.

This application is related to U.S. application Ser. No. 12/672,536, filed on Jan. 19, 2011, entitled "MEASURING PROPERTIES OF STRATIFIED OR ANNULAR LIQUID FLOWS IN A GAS-LIQUID MIXTURE USING DIFFERENTIAL PRESSURE", the disclosure of which is incorporated herein by reference for all purposes.

This application expressly incorporates by reference U.S. Pat. No. 6,758,100, filed on Jun. 4, 2001, in its entirety for all purposes.

BACKGROUND

This disclosure relates in general to multiphase flow measurement for oil-gas wells and, but not by way of limitation, to high gas volume flow fraction/holdup and/or velocity/flow-rate measurements.

Most oil-gas wells ultimately produce both oil and gas from an earth formation, and also often produce water. Consequently, multiphase flow is common in oil-gas wells. Surface monitoring of oil and gas producing wells is tending towards metering multiphase flows with a wide range of gas volume fraction (GVF). An example of this is the so called wet-gas wells, where the GVF is typically larger than 95% and the liquid flow rate is typically no more than a few hundred barrels per day. For such production pipes, it is often required to measure the gas flow rate and the liquid flow rate, as well as the composition of the liquid phase, e.g. water/liquid hydrocarbon ratio (WLR). For wells with a GVF<95%, in-line multiphase flow meters have been/are often used.

Two existing approaches to metering high GVF flows are separation and mixing. The separation approach provides for splitting the flow into an almost liquid flow in one channel/conduit and an almost gas flow in a separate channel/conduit and then separately metering the separated flows using single-phase flow meters. The mixing approach attempts to minimize the slip between the different phases by mixing the phases into a homogeneous mixture so that the velocity and holdup measurements can be simplified.

The existing methods are largely capable of providing good accuracy for metering gas flows with high GVF, however, the liquid rate metering accuracy is relatively poor. The disadvantage of such methods also include increased cost associated with the separation and mixing devices and extra pressure drop in the pipeline and/or disruption to the flow in the pipeline resulting from the introduction of the separation and/or mixing devices into the pipeline. Additionally, at high GVF, the mixing method may not provide for accurately measuring the holdup and WLR because the liquid holdup is very low under such conditions.

SUMMARY

Embodiments of the present invention provide for measuring flow properties of multiphase mixtures within a pipe carrying hydrocarbons produced from oil-gas wells. Embodiments of the present invention may provide for a combination of a clamp-on ultrasonic gas flow meter to measure flow characteristics of a gas phase in a pipeline and a pulsed Doppler sensor(s) and/or a radio-frequency (RF)/microwave electromagnetic (EM) sensor(s) to measure flow characteristics of a liquid phase. The combination of sensors may provide for multiphase flow measurements under certain flow conditions, such as for example when the gas-liquid is flowing in a substantially horizontal pipeline, when the flow is stratified or is caused to be stratified and/or the like. Stratification of the flow may be caused naturally by gravity separation or artificially by slowing down the flow through the use of pipe diameter expansion or contraction and/or the like.

In one embodiment, the present disclosure provides a method for measuring flow properties of a multiphase mixture of gas-liquid hydrocarbons and water flowing in a pipe of stratified flow. In one step, flow properties of a gas phase are measured in the pipe. Flow properties of a liquid phase are measured in the pipeline using a pulsed Doppler probe. A gas or liquid holdup is determined. A gas flow rate within the pipe is calculated using the gas holdup and the flow properties of the gas phase. A liquid flow rate within the pipe is calculated using the liquid holdup and the flow properties of the liquid phase.

In another embodiment, the present disclosure provides system for measuring flow properties of a multiphase mixture of gas-liquid hydrocarbons and water flowing in a pipe of stratified flow. The system includes an ultrasonic gas flow meter, a pulsed ultrasonic Doppler probe and a processor. The ultrasonic gas flow meter is configured to operatively engage the pipe and configured to measure flow properties of a gas phase in the pipe. The pulsed Doppler probe is configured to operatively engage with the pipe and configured to measure flow properties of a liquid phase in the pipe. The processor configured to determine a gas or liquid holdup, calculate gas flow rate within the pipe using the gas holdup and the flow properties of the gas phase, and calculate liquid flow rate within the pipe using the liquid holdup and the flow properties of the liquid phase.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 4A-4E depict cross-sectional plan views of embodiments of the pipe configuration where the cross-section is in a plane generally perpendicular to flow within a pipeline;

Figure 1A:
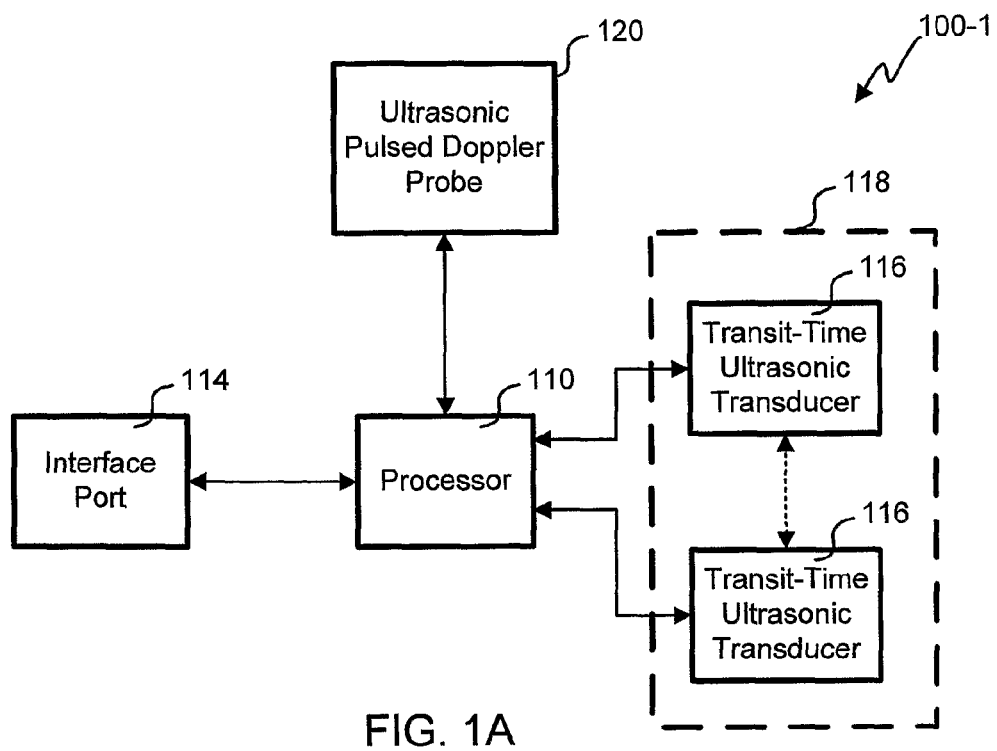
FIGS. 1A-1E depict block diagrams of embodiments of a multiphase flow measurement system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In certain aspects, the transit-time ultrasonic transducers may be positioned close to or above a center line of the pipeline or at a location on the pipeline corresponding to where the gas phase may be flowing in the pipeline to measure the gas phase in the pipeline. An ultrasonic pulsed Doppler probe(s) and/or electromagnetic (EM) transmitter and receivers may be disposed around a bottom section of a pipeline or at locations where stratified flow may cause the liquid phase to flow in the pipeline. In one aspect of the present invention, the EM transmitter and receivers are RF/microwave-based to determine water-to-liquid ratio (WLR) and water salinity (as described in U.S. Pat. No. 6,831,470, the entire disclosure of which is hereby incorporated by reference for all purposes).

In one embodiment of the present invention, the ultrasonic pulsed Doppler probes are arranged in a Doppler array around the circumference of the pipeline to measure the gas-liquid flow. Additionally, the Doppler array can be used to estimate the WLR measurement in some embodiments. Other embodiments use EM transmission as a WLR meter.

The slip velocity between the liquid and gas phases for a horizontal flow is very different from that for a vertical flow with the same gas volume fraction (GVF) value. Normally, the slip in the horizontal case is much larger. This means that even with the same GVF, the liquid holdup in the horizontal case is normally much larger than that in the vertical case. As a result, the flow regime map for horizontal flows is very different from that for vertical flows.

Generally as an approximate rule, the flow regime in the horizontal flow is a stratified one if the liquid superficial velocity is less than 0.1 m/s and the gas superficial velocity is less than 25 m/s. For gas superficial velocity beyond 25 m/s, the flow regime may take on an annular-mist flow. Applicants have found that even in the annular flows, however, most of the liquid forms a stratified layer towards the bottom part of the pipe bore while the rest of the liquid in the flow either forms a thin and slow-moving liquid film on the pipe wall, or is carried as droplets in the gas phase.

Applicants have determined that liquid holdup is typically 15 times of liquid cut for GVF>0.95 and the liquid flow rate<3 $m^3/hr$. This means that if the liquid flow rate is 1% of the total flow rate, then the liquid holdup is 15%. Therefore, the gravity separation helps to create a liquid-rich region towards the lower part of a horizontal pipe, and a gas-rich region above it. Knowing the phase distribution in such flows, embodiments of the present invention provide various velocity and holdup measurements that may be optimized for the different phase regions. For instance, in certain aspects that liquid holdup measurement may be performed around the lower part of a horizontal pipe bore, whereas gas velocity may be measured at around the middle and upper part of the horizontal pipe. As such, one of the embodiments of the present invention provides for a multiphase flow meter that may, in certain aspects, be used to measure horizontal gas-liquid stratified flows, including high-gas and low-liquid wet-gas stratified flows.

Embodiments of the present invention provide for metering of gas/water/oil flows from oil-gas producing wells. For wet-gas wells, the GVF of the flow may be larger than 95% and the liquid flow rate may be less than 5 $m^3/hr$. The flow regime for such flows in a horizontal pipeline is mainly stratified or slightly annular, i.e., most of the liquid phase forms a stratified flow layer towards the bottom of the pipe, whereas gas travels above the liquid phase. Utilizing such a natural separation of the phases, some embodiments of the present invention may provide for measuring the flow rates of the phases in the separate liquid and gas zones.

Based upon analysis of stratified gas-liquid flows, embodiments of the present invention provide for a multi-sensor configuration for multiphase flow metering, which in some aspects may be optimized for metering horizontal stratified multiphase flows, including wet-gas flows under high-gas and low-liquid conditions.

Gas velocity may be measured by using a gas flowmeter, e.g. an ultrasonic transit-time gas flowmeter, which may be installed around the appropriate height of the pipe bore to ensure measurement of the gas-only/gas-rich zone. An additional cross-pipe ultrasonic transmission measurement, along a direction that is perpendicular to the flow direction, may provide information on the liquid droplet holdup in the gas phase. Such information may be used to improve the accuracy of both gas and liquid flow rate measurements. The liquid flow velocity and liquid holdup may be measured by an array of ultrasonic Doppler sensors mounted around the circumference of the pipe. The WLR in the liquid-phase may be measured by at least one pair of EM wave transmitter and receiver, whose transmission path is mostly covered by the liquid-rich region towards the bottom of the pipe. The flowmeter may be built around a section of straight pipeline and may use non-intrusive sensors, and, therefore, provide no disturbance to the flow.

In one embodiment of the present invention, an ultrasonic clamp-on transit-time gas flowmeter and a range-gated ultrasonic Doppler probe may be used for the measurement of gas and liquid flow velocities of stratified gas-liquid flow in a horizontal or near horizontal production pipeline. To measure the gas flow velocity, a pair of transit-time ultrasonic gas flow transducers may be installed to provide ultrasonic beam(s) across the pipe horizontally sideways. The ultrasonic Doppler probe may be installed at the pipe underside to measure the flow velocity and thickness (hence volume fraction or holdup) of the dominant liquid layer. The liquid-layer thickness may be estimated from a time delay measurement where the range-gated Doppler energy is at a maximum. The gas and liquid flow rates may then be determined from the above gas-liquid velocities and liquid fraction measurements, without intruding into the production flows within the pipeline.

In certain aspects, transit-time (gas) and Doppler (liquid) flow velocity and holdup measurements may also be used to derive the prevalent flow-regime information (from flow-regime maps), hence facilitating the use of a more flow-regime specific correlation of gas-liquid velocity slip for an alternative determination of gas-liquid flow rates.

Referring first to FIG. 1A, a block diagram of an embodiment of a multiphase flow measurement system 100-1 is shown. The multiphase flow measurement system 100 measures stratified gas-liquid flow. Among other places in this specification, this embodiment is variously described in at least FIGS. 1A, 2A, 3A, and 4A. This embodiment includes an ultrasonic gas flowmeter 118, an ultrasonic pulsed Doppler probe 120, a processor 110, and an interface port 114. This embodiment is configured to operate where the GVF is below 75% or 80% and/or the flow rate corresponds to a low producing well such that the phases stratify in a horizontal pipeline (e.g., below about 2000-5000 bbl/day in a 3 inch pipeline).

The ultrasonic gas flowmeter 118 measures a velocity of the gas phase. At least two transit-time ultrasonic transducers 116 send an ultrasonic signal between each other and the upstream and downstream flow transit times can be measured. The flow velocity of the gas phase affects the transit time, such that a measurement of the transit times can be used to derive the gas flow velocity. The transit-time ultrasonic transducers 116 can be configured to clamp-onto the pipeline or could be embedded into an orifice of the pipe wall. The pair of transit-time ultrasonic transducers 116 are clamped around the periphery of a horizontal production flow pipe to align the ultrasonic beam(s) across the pipe diameter horizontally sideways. That is to say that the transit-time ultrasonic transducers 116 are positioned at different points along the pipeline such that they are angled with the flow direction of the gas phase. Each of the transit-time ultrasonic transducers 116 can both send and receive signals. Transit-time testing could involve one transit-time ultrasonic transducer 116-1 sending a first signal that is received by the other transit-time ultrasonic transducer 116-2 before a second signal is sent in the opposite direction.

The ultrasonic pulsed Doppler probe 120 is range-gated in this embodiment. The Doppler probe 120 could operate at 1 MHz, for example, to measure flow velocity of the dominant liquid layer. This embodiment clamps the ultrasonic pulsed Doppler probe 120 on the pipe underside to measure the flow velocity of the dominant liquid layer flowing at the pipe bottom. Additionally, the liquid level or height of the liquid-gas interface can also be determined by the ultrasonic pulsed Doppler probe 120. The internal cross-sectional area of the pipe can be measured from an ultrasonic pipe-wall thickness gauge, or estimated with readings from the ultrasonic pulsed Doppler probe 120. The internal cross-sectional area is used with the flow velocity and holdup measurements to determine the volume of liquid, hydrocarbon and/or gas passing through the pipeline per unit time.

A processor 110 is configured with a state machine and/or software to automatically determine certain parameters from the gathered information. Additionally, the various probes and transducers are driven and read with the processor 110. Gas, liquid and hydrocarbon flow velocity and volume fraction/holdup can be determined by the processor 110. Any input or output of the multiphase flow measurement system 100 passes through an interface port 114. Some embodiments could include a display that shows the determined results and measurements, but this embodiment just relays that information out the interface port 114 to a data logging device.

Figure 1B:
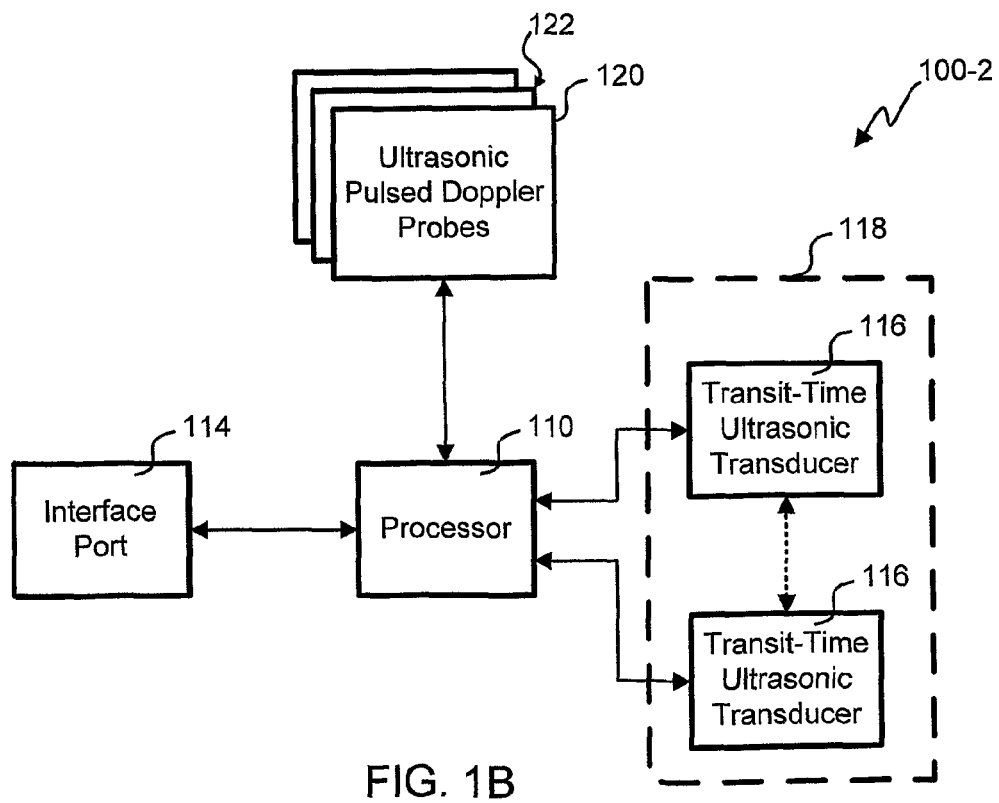

With reference to FIG. 1B, a block diagram of another embodiment of the multiphase flow measurement system 100-2 is shown. Among other places in this specification, this embodiment is variously described in at least FIGS. 1B, 2B, 3B, and 4B. This embodiment uses multiple ultrasonic pulsed Doppler probes 120 arranged into a Doppler array 122 to allow more accurate readings than when a single probe 120 is used. The spatial distribution of the probes 120 in the Doppler array 122 in some aspects of the present invention may be dense around the lower part of the horizontal pipe to provide better liquid-gas interface detection resolution.

When there is only gas or a wetting film of liquid within the pipe adjacent to a Doppler probe 120 the reflection is considerably different from the circumstance were the Doppler probe 120 is adjacent to the liquid phase. The returned Doppler energy level is higher when the Doppler probe 120 is adjacent to the liquid phase. By noting which one of the Doppler probes 120 appear to be adjacent to a wetting film rather than the liquid phase, the liquid-gas interface can be further estimated in this embodiment.

Figure 1C:
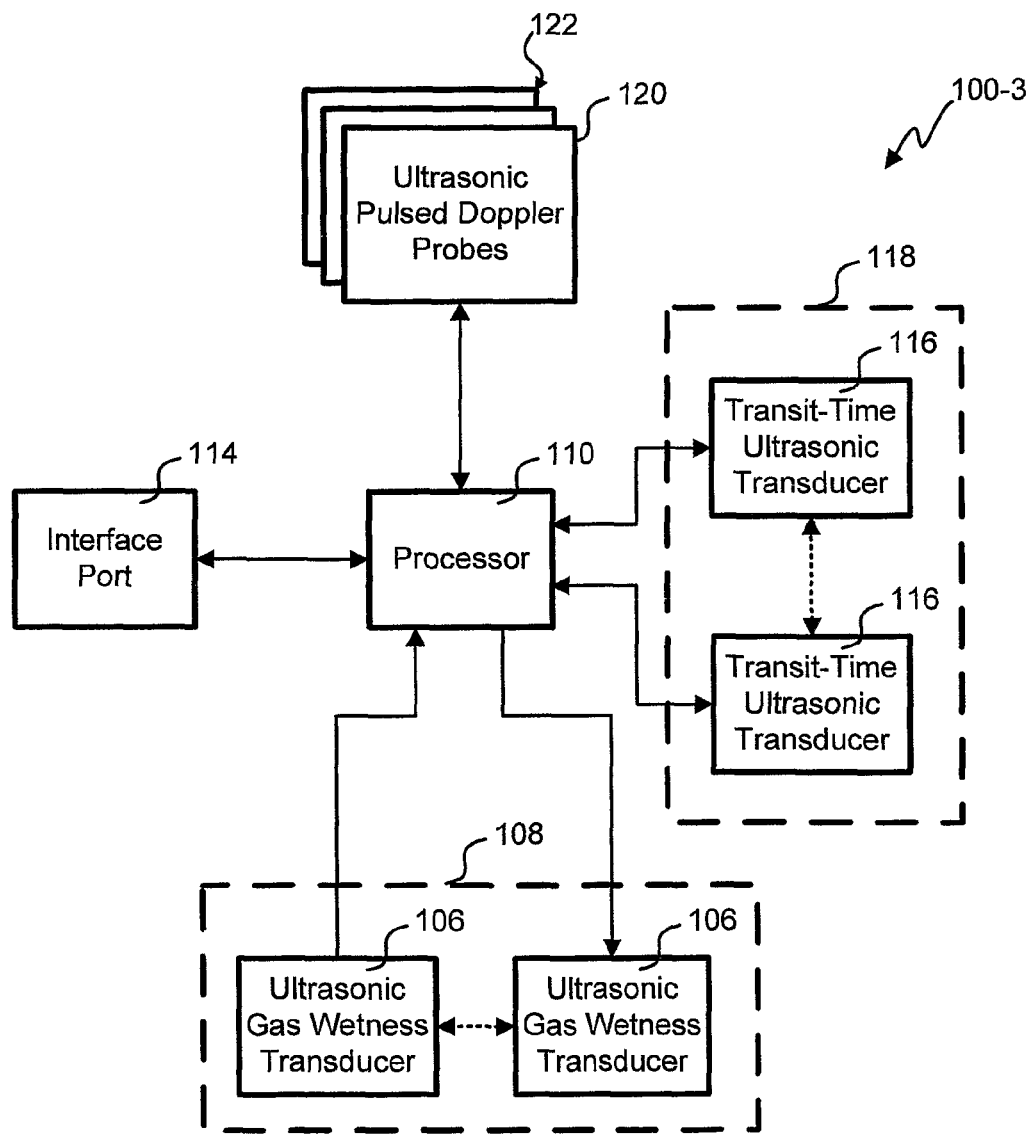

Referring next to FIG. 1C, a block diagram of yet another embodiment of the multiphase flow measurement system 100-3 is shown. Among other places in this specification, this embodiment is variously described in at least FIGS. 1C, 2C, 3C, and 4C. In contrast to the embodiment of FIG. 1B, this embodiment also includes a gas wetness meter 108 that measures the wetness of the gas phase using ultrasonic gas wetness transducers 106 positioned on opposites of the pipeline near the top portion of the pipeline to be adjacent to the gas phase. The ultrasonic gas wetness transducers can be impedance matched to the gas expected in the pipeline.

The gas wetness meter 108 measures wet-gas flow, in accordance with one embodiment of the present invention to correct for gas mist in the gas flow rate determination. As mentioned above, gas velocity may be measured by an ultrasonic transit time method using the ultrasonic gas flowmeter 118. For the configuration shown in FIGS. 1C, 2C, 3C, and 4C, the transit times are linked to the flow velocity by the following equation:

$$(t_{BA}-t_{AB})/(t_{BA}t_{AB})=2XV/L^2 \quad (1)$$

where $t_{AB}$ is the ultrasonic transit time from point A to B (down stream), $t_{BA}$ is the upstream transit time, X is the separation of the transducers along the flow direction, L is the length of the ultrasonic propagation path and V is the flow velocity. Note that in equation (1) the two transit time measurements are combined in such a way that the velocity of sound has no influence on the measurement of V.

In a further aspect of the present invention, calculations of transit-times ($t_{AB}$, $t_{BA}$) may be used to determine the mixture sound velocity c (note that c>>V), $$c \approx 2L/(t_{AB}+t_{BA}) \quad (1B)$$

This measured c may be combined with the measurement of the upstream/downstream transmission attenuation to derive gas-phase wetness.

For a horizontal pipeline configuration, it can be automatically confirmed that the ultrasound path is entirely through the gas phase. For example, for wet gas applications the liquid holdup is normally well below 50%, the ultrasound path can be in the horizontal plane intersecting the centre of the pipe. Here, the flow rate of gas is given by equation (2):

$$q_{GAS}=V(1-\alpha_{Liq})A \quad (2)$$

where $\alpha_{Liq}$ is the liquid holdup in the pipe and A is the pipe cross-sectional area.

While measuring the liquid holdup in the liquid continuous regions, such as in the stratified layer near the bottom of the pipe bore and in the film on the pipe wall, there may be some fine liquid droplets entrained in the gas phase at $V_{gas}$>25 m/s. The effect of the droplet concentration, if uncorrected, may result in additional measurement error. The droplet concentration may be measured by an ultrasonic energy propagating perpendicular to the flow direction. The transit time and attenuation of this energy can be used to estimate the holdup of the liquid mist. The relationship between the velocity of sound and the droplet concentration can be derived from a following equation (3):

$$c = 1/\sqrt{(\rho\beta)} \quad (3)$$

where ρ is the density of the fluid mixture, β the compressibility and c the velocity of sound in the mixture.

An increase in droplet concentration results in an increase in ρ, but an insignificant change in β. The overall effect is a reduction in sound velocity as the droplet concentration increases. The attenuation of the ultrasonic energy is a linear function of droplet concentration provided that the concentration is low (typically less than 5% of pipe cross-section) and that the ultrasonic wavelength is chosen to be long compared with the droplet size.

Figure 1D:
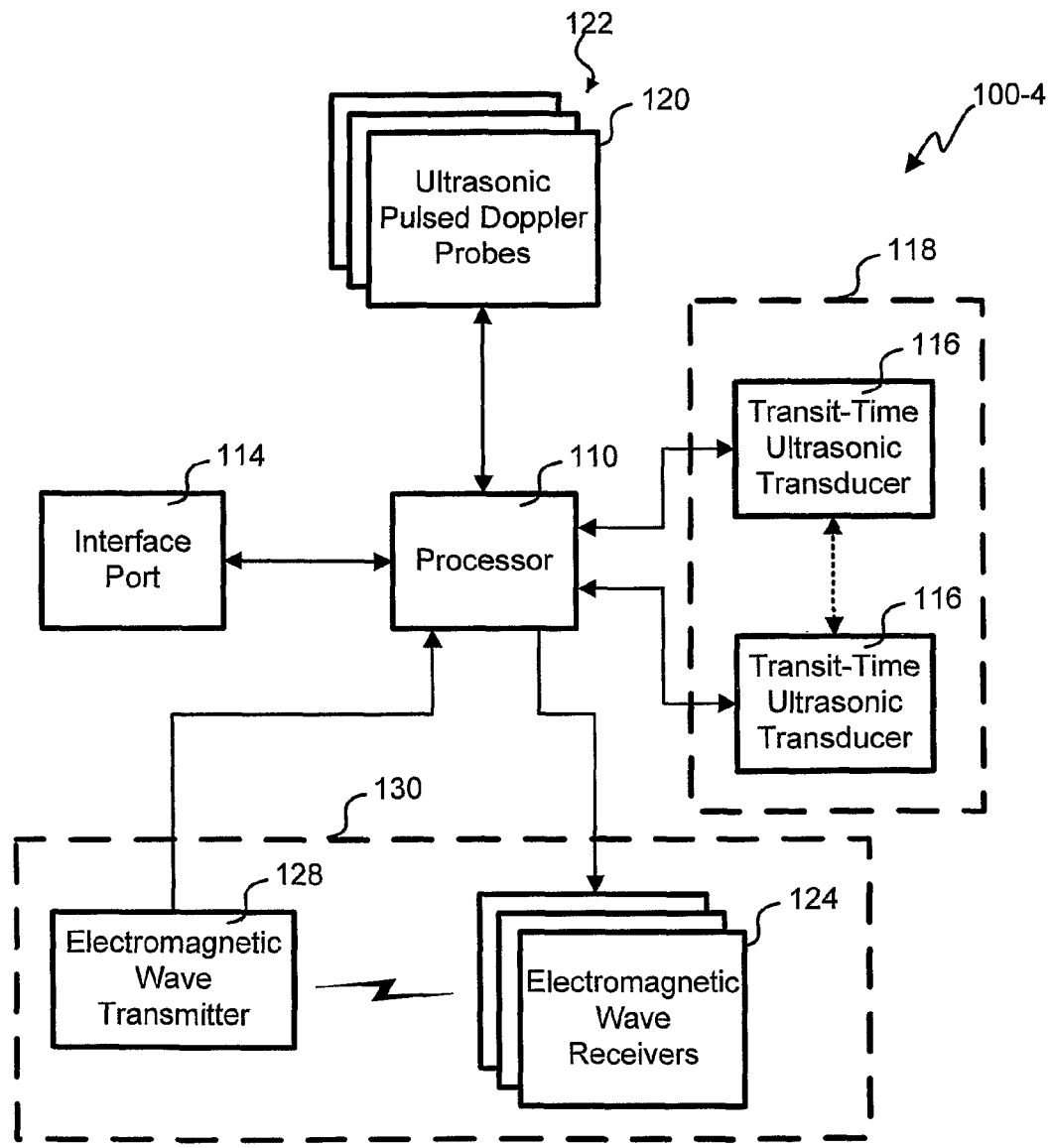

With reference to FIG. 1D, a block diagram of still another embodiment of a multiphase flow measurement system 100-4 is shown. Among other places in this specification, this embodiment is variously described in at least FIGS. 1D, 2D, 3D, and 4D. This embodiment includes an ultrasonic gas flowmeter 118 to measure gas velocity, a Doppler array 122 to measure liquid holdup and velocity of the liquid phase and a WLR meter 130. This embodiment of the WLR meter 130 uses an electromagnetic (EM) wave transmitter 128 that sends a signal to a number of EM wave receivers 128. The EM wave transmitter 128 is typically at the bottom of the pipeline, and the EM wave receivers 124 are placed around the circumference of the pipeline in places likely to be adjacent to the fluid layer. The WLR and water conductivity/salinity affects the transmitted EM wave phase-shift and/or amplitude-attenuation measurements such that WLR and water salinity can be determined.

Other embodiments could use multiple EM wave transmitters 128 working with a single EM wave receiver 124. The EM wave transmitters 128 could transmit sequentially or at different frequencies simultaneously to achieve diversity in this embodiment.

Prior embodiments estimated WLR using one or more ultrasonic pulsed Doppler probes 120. This embodiment uses microwave EM devices 124, 128 to determine WLR, although nuclear methods based on dual-energy Gamma-ray measurements may be used to replace the ultrasonic and microwave EM holdup measurements of other embodiments. Still other embodiments could use any combination of microwave EM, Gamma-ray and/or ultrasonic to determine WLR.

Figure 1E:
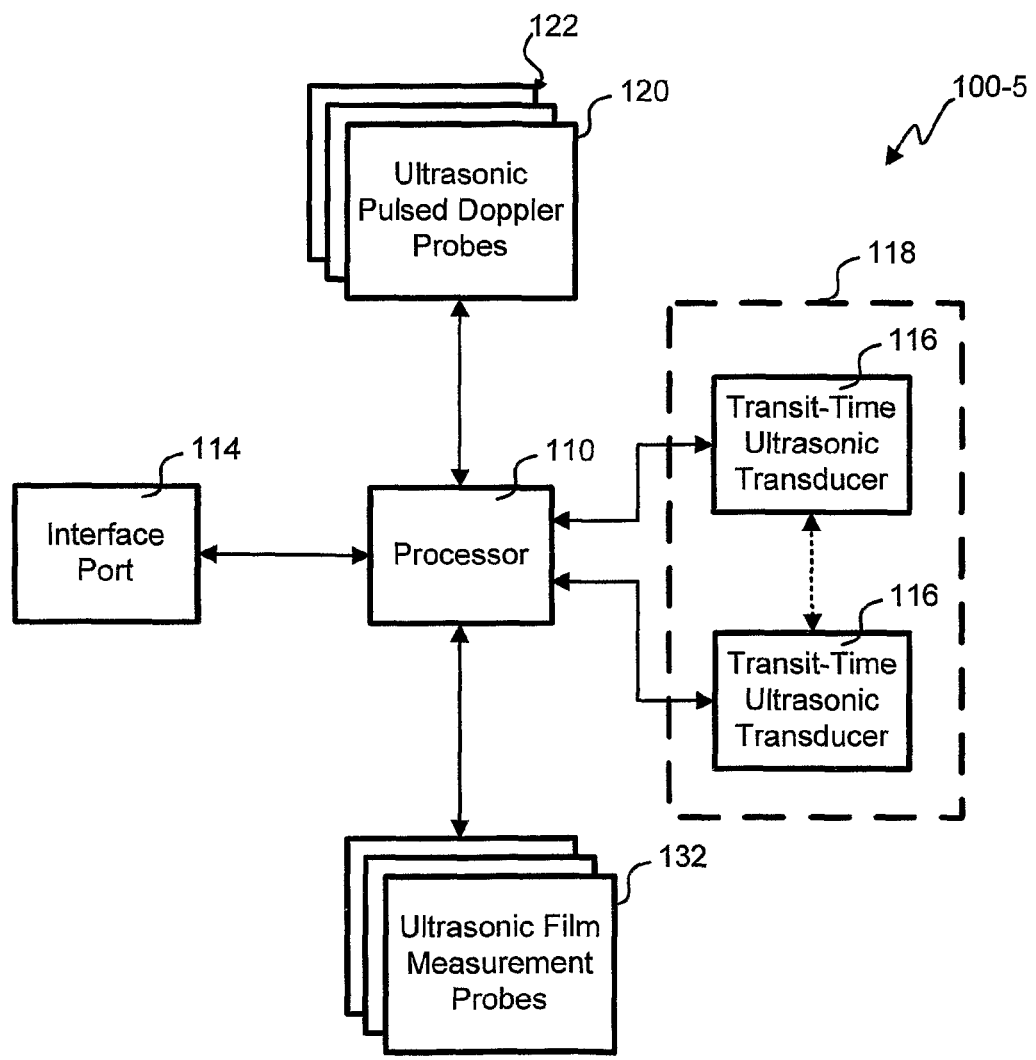

Referring next to FIG. 1E, a block diagram of an embodiment of the multiphase flow measurement system 100-5 is shown. Among other places in this specification, this embodiment is variously described in at least FIGS. 1E, 2E, 3E, and 4E. This embodiment uses ultrasonic film measurement probes or transducers 132 near the gas phase to measure liquid or other film on the interior of the pipeline. The ultrasonic film measurement probes 132 are high frequency. In this way, the Doppler array 122 spaces its ultrasonic probes 120 more tightly around the lower part of the horizontal pipe to provide better liquid-gas interface detection resolution, whereas the film measurement probes 132 are sparse around the upper half for film thickness measurement.

Figure 2A:
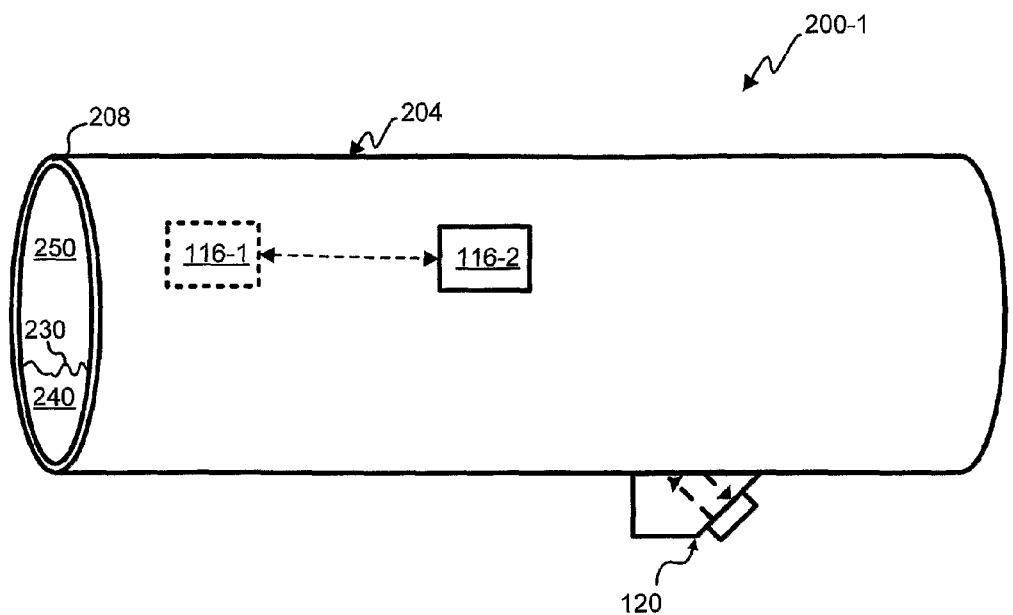
FIGS. 2A-2E depict orthographic diagrams of embodiments of a pipe configuration detailing components of the multiphase flow measurement system.

With reference to FIG. 2A, an orthographic diagram of an embodiment of a pipe configuration 200-1 is shown that details components of the multiphase flow measurement system 100-1. The pipeline 204 is made from a plastic liner 208 arranged in a cylindrical form. Within the pipeline are a liquid phase 240 and a gas phase 250 separated by a liquid-gas interface 230. To show blocks on the obscured back side of the pipeline 204, dashed lines are used for those blocks. For example, the first transmit-time ultrasonic transducer 116-1 is on the back side of the pipeline and the second transmit-time ultrasonic transducer 116-2 is on the front side.

The transmit-time ultrasonic transducers 116 are placed at different places along the length of the pipeline 204 such that the signals are angled toward the axis of flow within the pipeline 204. This embodiment uses a single ultrasonic pulsed Doppler probe 120 located at a bottom of the pipeline 204.

Figure 2B:
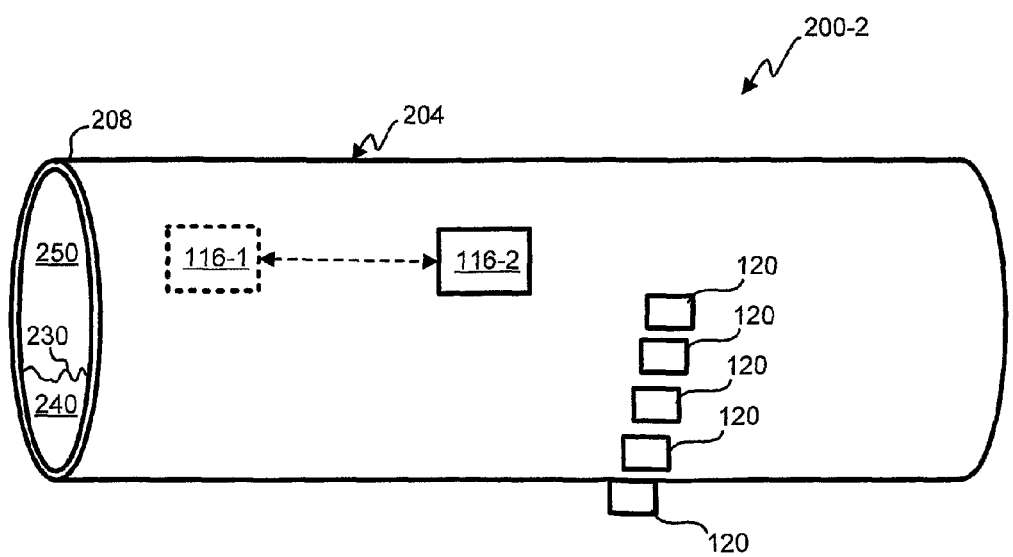

Referring next to FIG. 2B, an orthographic diagram of another embodiment of a pipe configuration 200-2 is shown that details components of the multiphase flow measurement system 100-2. This embodiment has multiple ultrasonic pulsed Doppler probes 120 arranged circumferentially on a front of the pipeline 204. Additional ultrasonic pulsed Doppler probes 120 allow for more accurate readings. Further, the height of the liquid-gas interface can be determined with generally better accuracy when there is a Doppler array 122 arranged about a circumference of the pipeline 204.

Figure 2C:
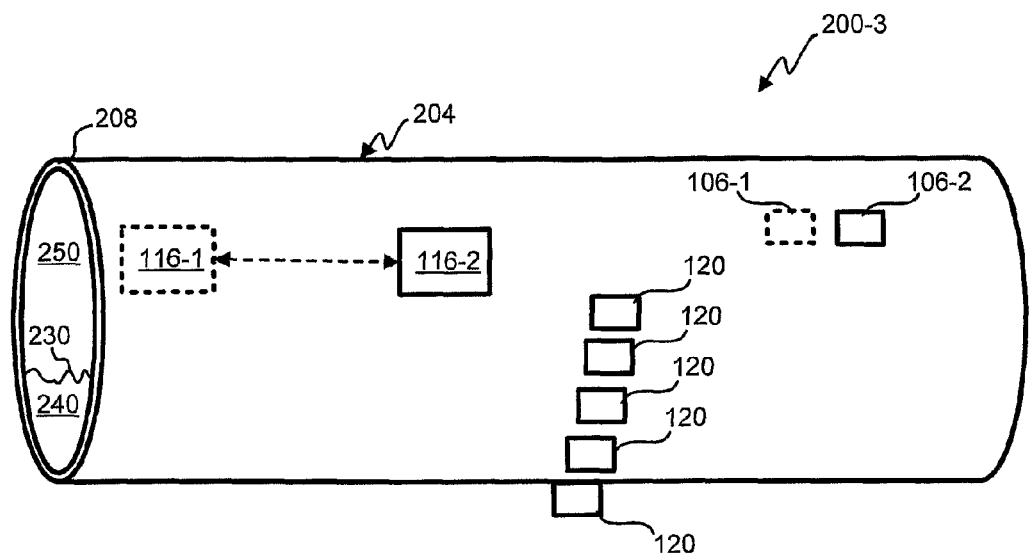

With reference to FIG. 2C, an orthographic diagram of yet another embodiment of a pipe configuration 200-3 is shown that details components of the multiphase flow measurement system 100-3. This embodiment is similar to the embodiment of FIG. 2B, but also includes the gas wetness meter 108. Two ultrasonic gas wetness transducers 106 are arranged in the top hemisphere of the pipeline 204 in a position likely to be in contact with the gas layer 250 to form the gas wetness meter 108. The two wetness transducers 106 are generally directly opposite each other along the same circumference.

Figure 2D:
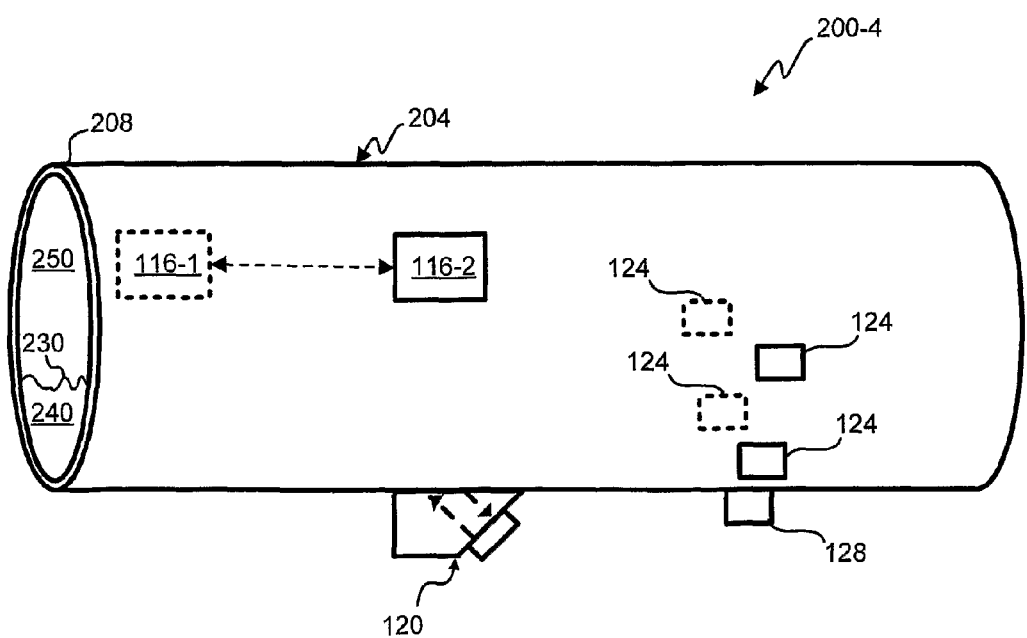

Referring next to FIG. 2D, an orthographic diagram of still another embodiment of a pipe configuration 200-4 is shown that details components of the multiphase flow measurement system 100-4. This embodiment uses RF/microwave EM signals in a WLR (and water salinity) meter 130. About the lower hemisphere of the pipeline 204, there are arranged EM wave receivers 124 that receive an RF/microwave signal from the EM wave transmitter 128 positioned at the bottom of the pipeline. The various EM wave elements 124, 128 are generally located along a same circumference of the pipeline 204.

Figure 2E:
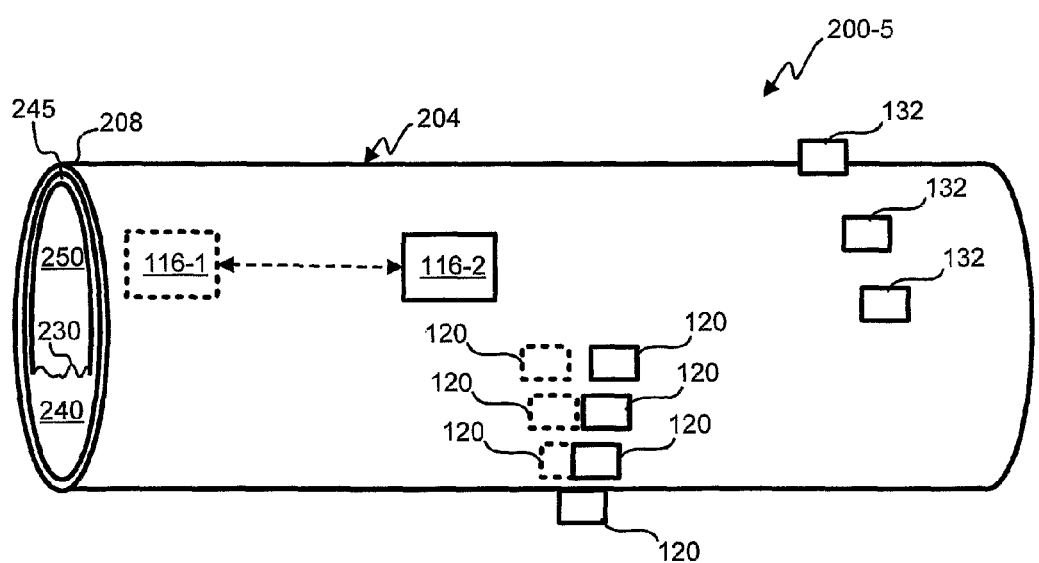

With reference to FIG. 2E, an orthographic diagram of an embodiment of a pipe configuration 200-5 is shown that details components of the multiphase flow measurement system 100-5. In addition to the ultrasonic gas flowmeter 118, this embodiment has a Doppler array 122 and ultrasonic film, measurement transducers 132. Merely by way of example, the Doppler array 122 may include seven ultrasonic pulsed Doppler probes 120, as depicted in FIG. 2E, distributed along a circumference of the lower hemisphere of the pipeline 204. In other embodiments, other amounts of Doppler probes may be used. Less sparsely, the ultrasonic film measurement transducers 132 are distributed along a circumference of the upper hemisphere of the pipeline 204. Other embodiments could distribute the probes 120 and transducers 132 somewhat randomly in their respective hemispheres and not necessarily along a same circumference with the others.

Figure 3A:
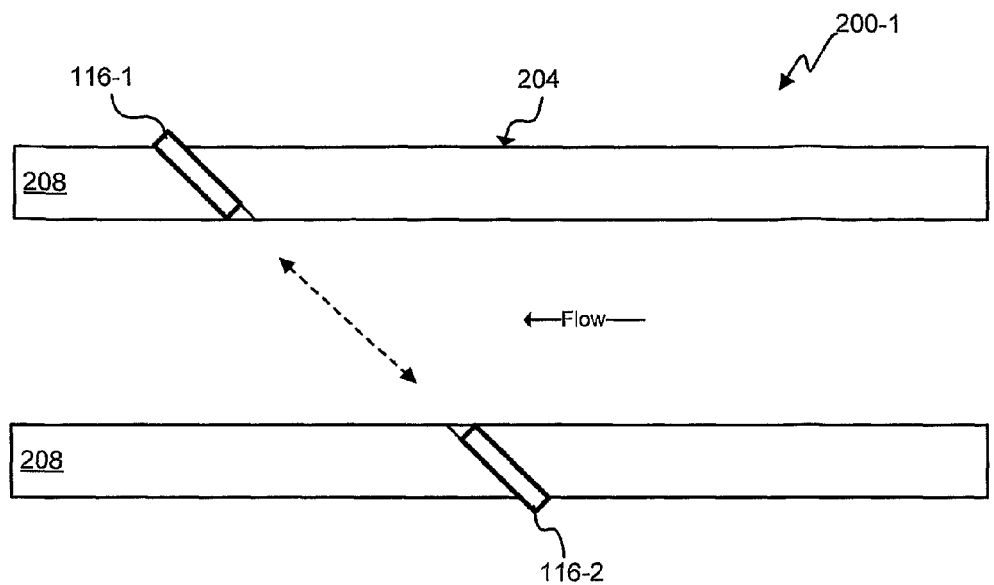
FIGS. 3A-3E depict cross-sectional plan views of embodiments of the pipe configuration where the cross-section is in a plane generally parallel to a gas-liquid interface.

Referring next to FIG. 3A, a cross-sectional plan view of an embodiment of the pipe configuration 200-1 is shown where the cross-section is in a plane generally parallel to the gas-liquid interface 230 around the middle or in the upper hemisphere of the pipeline 204. The transit-time ultrasonic transducers 116 point toward each other and are embedded into the plastic liner 208 in this embodiment, but could be clamp on in other embodiments. The other elements of the multiphase flow measurement system 100-1 do not appear in this cross-section and are not depicted.

Figure 3B:
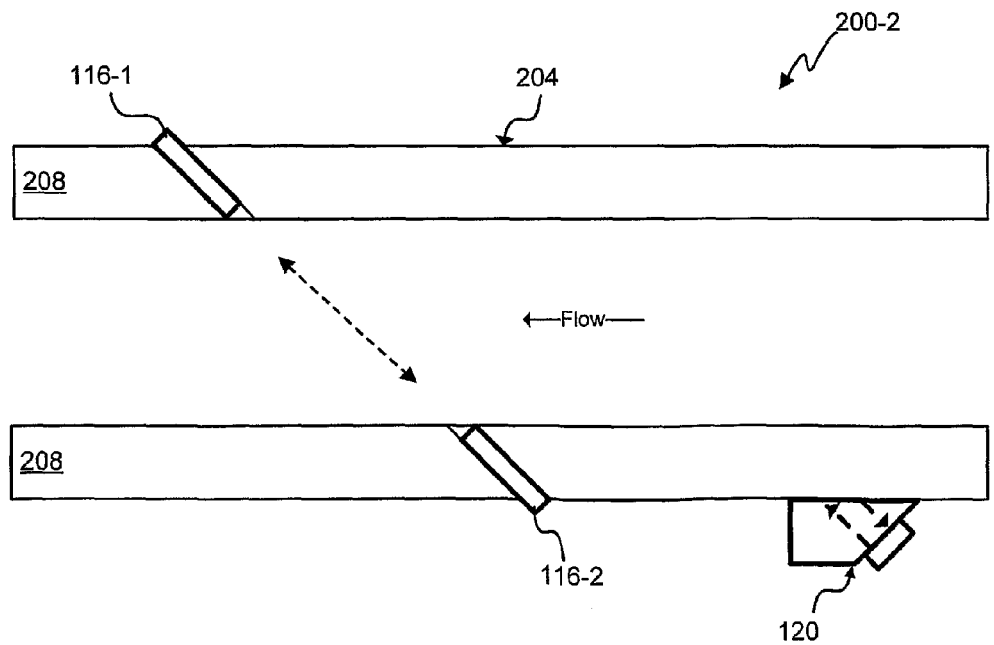

With reference to FIG. 3B, a cross-sectional plan view of another embodiment of the pipe configuration 200-2 is shown where the cross-section is in the plane generally parallel to the gas-liquid interface 230. In addition to showing the transit-time ultrasonic transducers 116, this embodiment shows one of the ultrasonic pulsed Doppler probes 120 that is part of a Doppler array 122.

Figure 3C:
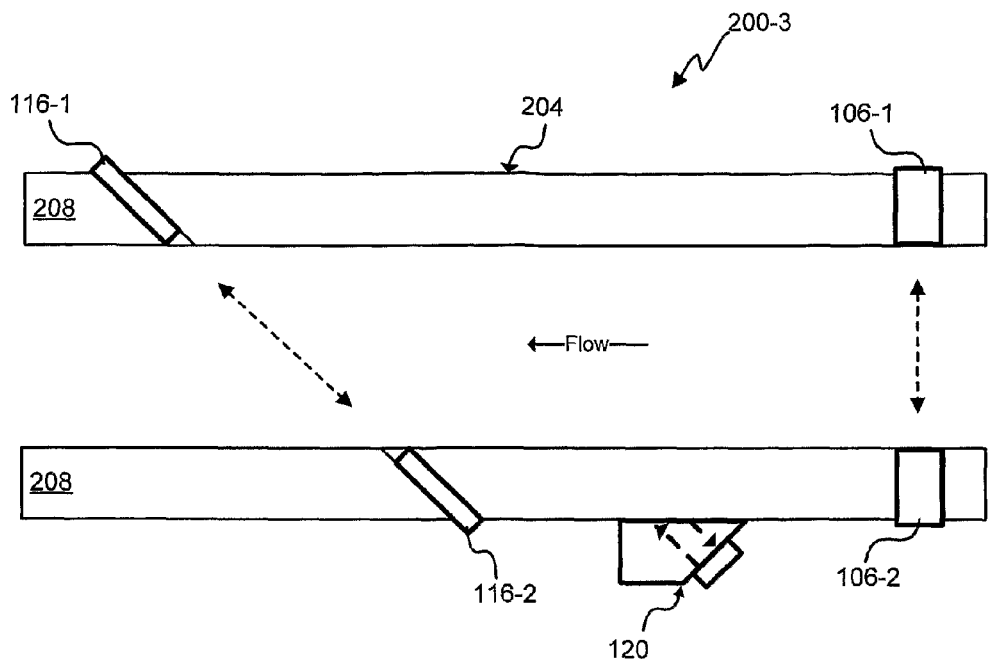

Referring next to FIG. 3C, a cross-sectional plan view of yet another embodiment of the pipe configuration 200-3 is shown where the cross-section is in the plane generally parallel to the gas-liquid interface 230. In addition to the items shown in the embodiment of FIG. 3B, this embodiment shows ultrasonic gas wetness transducers 106 arranged in the plastic liner 208, but other embodiments could use a clamp-on configuration.

Figure 3D:
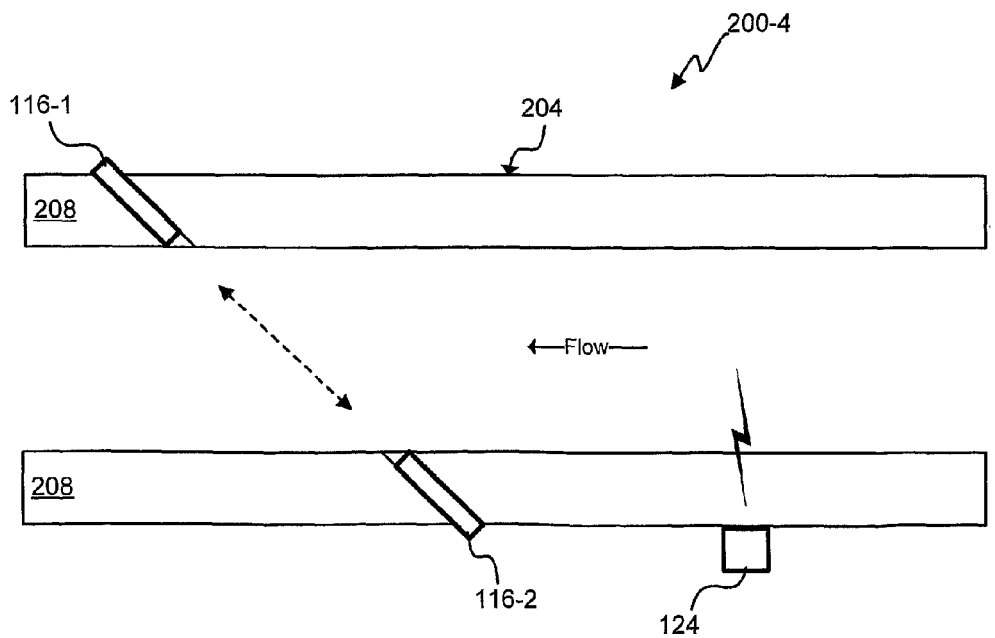

With reference to FIG. 3D, a cross-sectional plan view of still another embodiment of the pipe configuration 200-4 is shown where the cross-section is in the plane generally parallel to the gas-liquid interface 230. FIGS. 3D and 4D show the arrangement of the WLR meter 103 and its EM wave receiving/transmitting elements 124, 128. Only a single EM wave receiver 124 is shown in the cross-section of FIG. 3D, but it is to be understood that there are many EM wave receivers 124 distributed in a manner such that they are likely to be adjacent to the liquid phase 240.

In this embodiment, an EM wave transmitter 128 and multiple EM wave receivers 124 are used for measuring water holdup and water salinity in the stratified liquid layer using RF/microwave methods, in accordance with one embodiment of the present invention. As shown in FIGS. 3D and 4D, an EM wave transmitter 128 is mounted at the underside of the pipe (with a suitable dielectric-material window), emitting a frequency in the range of a few hundred MHz to a few GHz, for example. Several EM wave receivers 124 are mounted around the pipe circumference (also with suitable dielectric-material windows) at angular positions, for example, 30, 60 and 90 degrees from the EM wave transmitter 128. An appropriate EM wave receiver 124 is selected according to its position with respect to the position of the gas-liquid interface 230. Normally the EM wave receiver 124 whose position is above the gas-liquid interface 230 and who has the maximum percentage of its sensing path covered by liquid may provide the most sensitive measurement (e.g., the fourth EM wave receiver 124-4 in FIG. 4D). The selection of the suitable EM wave receiver 124-4 can be helped by the gas-liquid interface measurement information produced by the ultrasonic Doppler array 122 measurements.

The RF/microwave measurement is sensitive to the fraction of its transmission path that is covered by water. It is much less sensitive to the difference between oil and gas. As such, RF/microwave attenuation and the like are proportional to water holdup for a fixed water conductivity (salinity). Water holdup measured by the RF/microwave may be combined with the total liquid holdup measured by the method using the ultrasonic pulsed Doppler probe(s) 120 to derive the WLR. In case there is a slip between the oil and water (as in a stratified ease), the slip value, either estimated from a slip model or directly measured by the method using the ultrasonic pulsed Doppler probe(s) 120, may be used in determining the WLR. RF/microwave measurement also gives an on-line determination of the water conductivity and hence water salinity of the prevalent water phase under a multiphase flow condition, such as described in U.S. Pat. No. 6,831,470, which is hereby incorporated in its entirety for all purposes.

The flow rate of gas is given by Equation (2) above, in which the gas velocity V is measured by ultrasonic transit-time method and the holdup by various ultrasonic (Doppler and/or cross-pipe transmission) methods. Although the accuracy quoted for dry gas velocity measurement is high (i.e., within a few percent for a commercial meter), in the multiphase case, especially when significant slip between gas and liquid droplets exist, the accuracy might deteriorate. If the gas holdup measurement error is confined to, say ±5% (such relative accuracy may be achievable for gas holdup larger than 70%, as in typical wet-gas flows), then a gas flow rate error of ±10% can be achieved.

The liquid flow rate is determined from a combination of velocity and holdup both measured by ultrasonic Doppler methods, such as described in British Patent GB2363455 B. The velocity measurement accuracy achievable may be ±10%. The relative holdup measurement error, on the other hand, may be difficult to minimize especially at low liquid holdups. Therefore one would expect an increasing liquid rate error as the liquid flow rate decreases and the GVF increases. Transducer design for the inline application and advanced signal processing can reduce the level of error.

The contribution to the WLR error may come from the water holdup measurement error, the liquid holdup measurement error and also from the difference between the water holdup and the WLR because of a slip between the water and oil phases. The slip in velocity is likely to happen if the oil is separated from water in a stratified distribution. In this case, ignoring such a slip will lead to inaccurate estimation of the WLR and hence inaccurate oil and water flow rates. The Doppler array 122 with multiple probes 120 (e.g. shown in FIG. 2B) may be used to measure the velocity of the separated oil and that of the separated water in a stratified distribution, and hence the slip. The processor 110 can automatically recognize when such a slip is likely and change the models to more accurately estimate the WLR.

Figure 3E:
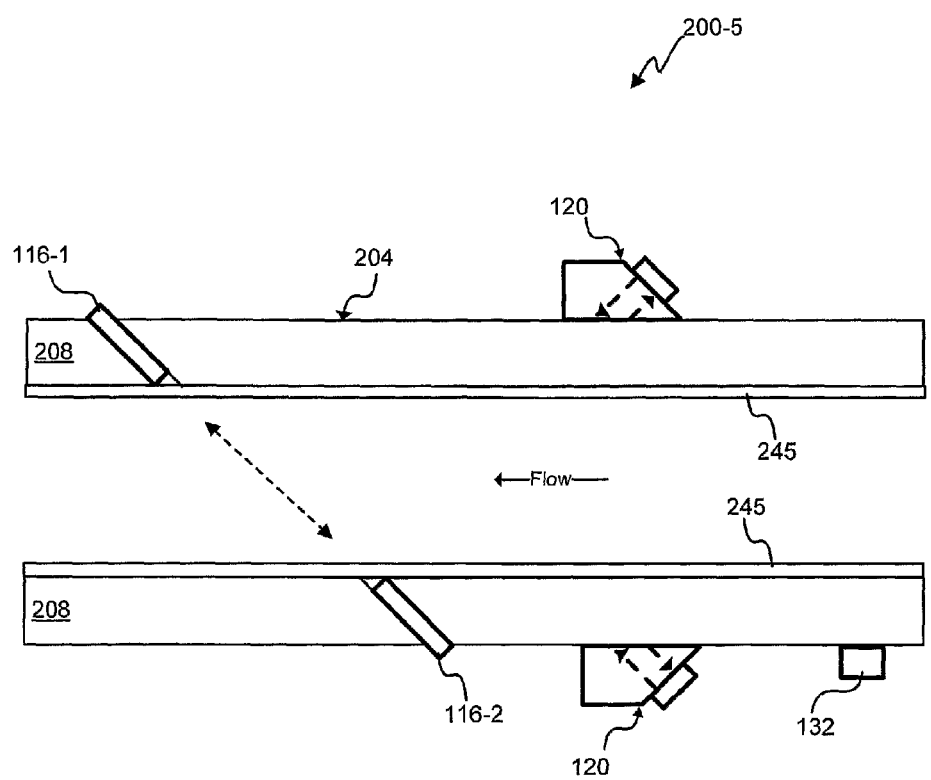

Referring next to FIG. 3E, a cross-sectional plan view of an embodiment of the pipe configuration 200-5 is shown where the cross-section is in the plane generally parallel to the gas-liquid interface 230. This embodiment has Doppler array 122 that extends from the front to the back of the pipeline. Additionally, there is an ultrasonic film measurement transducer 132 shown that is one of several to measure the liquid film 245 in the gas phase 250.

With reference to FIG. 4A, a cross-sectional plan view of an embodiment of the pipe configuration 200-1 is shown where the cross-section is in a plane generally perpendicular to flow within the pipe 204. Only some of the multiphase flow measurement system 100-1 is shown in this view. Specifically, the ultrasonic pulsed Doppler probe 120 is shown at the bottom of the pipeline 204 to measure the flow of the liquid phase 240 and the height of the gas-liquid interface 230.

Referring next to FIG. 4B, a cross-sectional plan view of another embodiment of the pipe configuration 200-2 is shown where the cross-section is in a plane generally perpendicular to flow within the pipe 204. This view shows the Doppler array 122 of the multiphase flow measurement system 100-2. Five ultrasonic pulsed Doppler probes 120 are used in this embodiment. The fifth ultrasonic pulsed Doppler probe 120-5 is above the gas-liquid interface 230 and the fourth ultrasonic pulsed Doppler probe 120-4 is below. By analysis of the readings from these probes 120-5, 120-4, the processor can determine that the gas-liquid interface 230 is between the two. Further, other probes below the gas-liquid interface 230 can estimate the height using reflections from the pulses.

With reference to FIG. 4C, a cross-sectional plan view of still another embodiment of the pipe configuration 200-3 is shown where the cross-section is in a plane generally perpendicular to flow within the pipe 204. Portions of the multiphase flow measurement system 100-3 are depicted in this view. Specifically, a Doppler array 122 along with the gas wetness meter 108. The passing of ultrasonic signals back and forth between the ultrasonic gas wetness transducers 106 is shown with a dashed line.

Referring next to FIG. 4D, a cross-sectional plan view of yet another embodiment of the pipe configuration 200-4 is shown where the cross-section is in a plane generally perpendicular to flow within the pipe 204. Portions of the multiphase flow measurement system 100-4 are depicted in this view. The four EM wave receivers 124 are shown distributed at different angles around a circumference of the lower hemisphere of the pipeline 204. The EM wave transmitter 128 is located at the bottom of the pipeline 204.

Figure 4E:
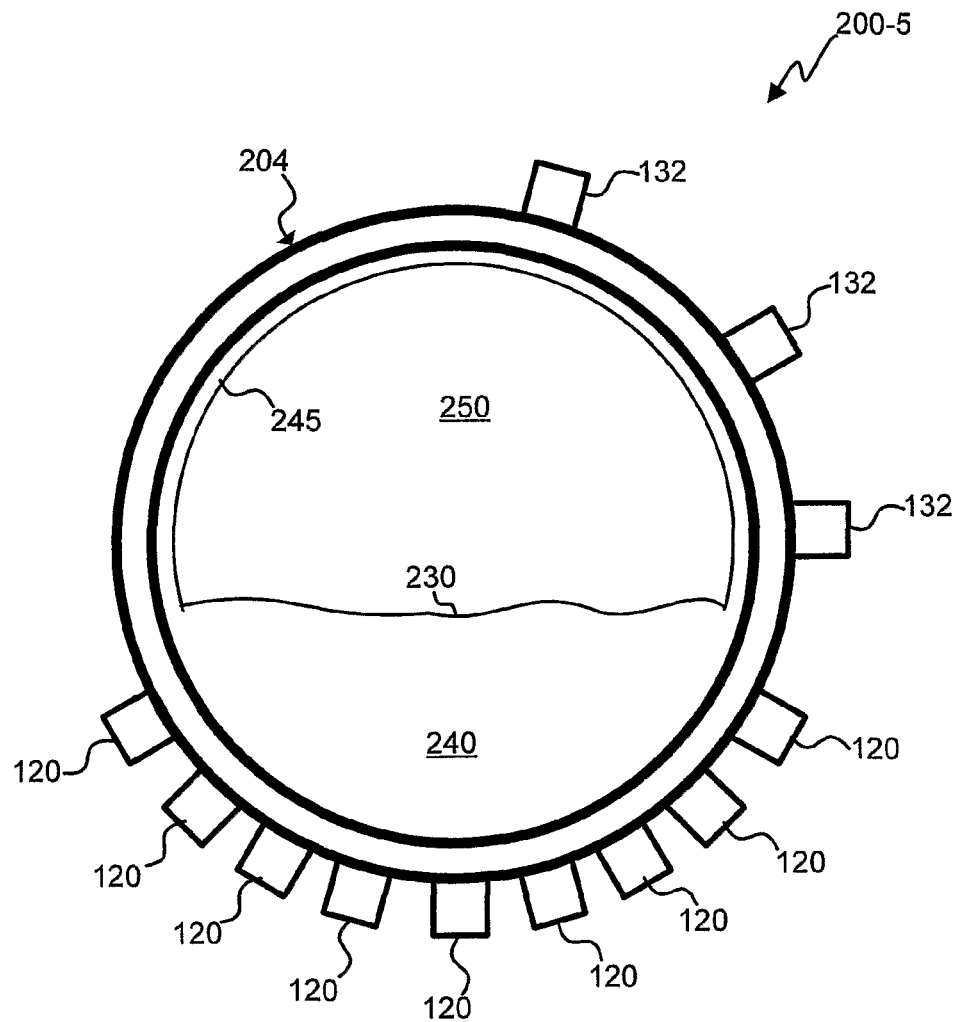

With reference to FIG. 4E, a cross-sectional plan view of an embodiment of the pipe configuration 200-5 is shown where the cross-section is in a plane generally perpendicular to flow within the pipe 204. This view shows the Doppler array 122 of the multiphase flow measurement system 100-5 along with the ultrasonic film measurement transducers 132. There are nine ultrasonic pulsed Doppler probes 120 in the Doppler array 122 of this embodiment, but other embodiments could have any amount between six and ten. The three ultrasonic film measurement transducers 132 each take a reading of the film. By knowing the location of the gas-liquid interface 230 and fluid dynamics models, the amount of liquid in the film can be estimated by the processor 110.

The three high frequency (hence high spatial and velocity resolutions) Doppler transducers 132 may be mounted on the upper part of the pipe 204 to measure the velocity and the thickness of the liquid film in an annular flow. Such information may then combined with the measurement of the liquid layer 240 near the lower part of the pipe 204, and with the flow rate of the entrained liquid droplets derived by the gas velocity flowmeter 118 and the gas wetness meter 108 to produce the overall liquid flow rate.

The measurement around the stratified liquid layer 240 can be done using a frequency lower than that used for film thickness measurement. Generally, the spatial resolution is proportional to the frequency f and the attenuation proportional to frequency $f^2$. Also for a pulsed Doppler system, the maximum velocity measurement range is inversely proportional to f. Merely by way of example, for the relatively fast moving liquid layer near the bottom of the pipe, a frequency of 1 to 3 MHz may be used in some embodiments depending upon the pipe size and for a slow moving thin film on the pipe wall, a frequency of 4 to 8 MHz may be used. A 5 MHz frequency has a 0.3 mm thickness resolution in water.

Figure 5:
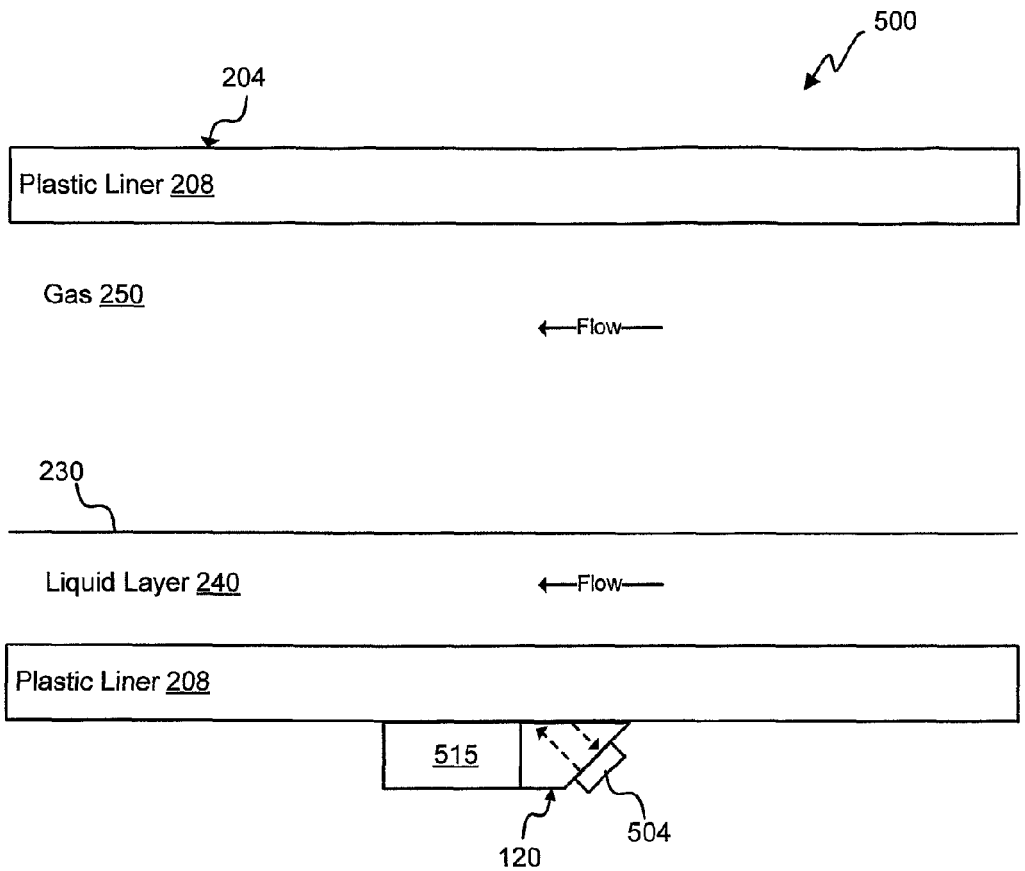
FIG. 5 depicts a block diagram of an embodiment of an ultrasonic pulsed Doppler probe engaged with a pipeline with multiphase flow.

Referring next to FIG. 5, a block diagram of an embodiment of the ultrasonic pulsed Doppler probe 120 engaged with the pipe 204 with multiphase flow is shown. A plastic block 515 is used to increase the accuracy of the ultrasonic pulsed Doppler probe 120. The plastic block 515 absorbs energy from a transducer crystal 504 and is impedance matched to the plastic liner 208. The function of the plastic block 515 is to attenuate energy traveling in the plastic liner wall 208, and thus producing a more predictable beam pattern in the flow. Other embodiments could use materials other than plastic for the block 515.

The details of Doppler measurement principle and signal processing methods for determining liquid velocity and holdup based on frequency shift and Doppler echo energy level for measuring stratified gas-liquid flow, in accordance with one embodiment of the present invention, have been described in U.S. Pat. No. 6,758,100, the entire disclosure of which is hereby incorporated by reference for all purposes. As provided in FIG. 4E, liquid velocity and holdup measurements may be made by a Doppler array 122 of range-gated ultrasonic Doppler transducers 120, which may be mounted around outside a pipe liner so that they are non-invasive to the flow. In such a configuration, the pipe circumference may be scanned by the Doppler array 122. Because the transducers only receive strong Doppler echoes from the region covered by the liquid phase 240, the liquid holdup may be determined from the Doppler energy distribution around the circumference. The velocity of the liquid phase 240 may be measured from the Doppler frequency shift.

Figure 6:
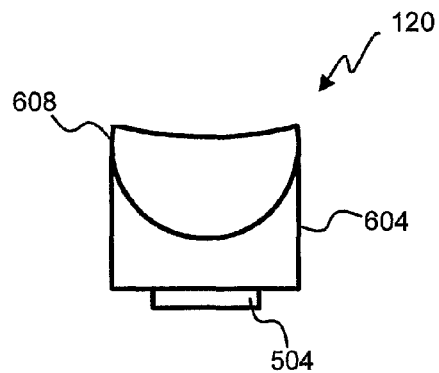
FIG. 6 depicts a block diagram of an embodiment of an ultrasonic pulsed Doppler probe with beam focusing capabilities.

With reference to FIG. 6, a block diagram of an embodiment of an ultrasonic pulsed Doppler probe is shown that has beam focusing capabilities. In the clamp-on case, the steel pipe-wall widens the ultrasonic beam and thus causes the reduction of the spatial resolution of the scan. As such, in certain aspects of the present invention, where possible, the steel pipe may be replaced by a plastic liner 208 in a section of the pipeline, which allows use of a focusing mechanism to improve the resolution. As shown in FIG. 6, a focusing delay-line can be made with a first material 604 that has a higher sound velocity than that of the plastic liner. The second material 608 has the same sound velocity as the pipe liner 208. In such an embodiment, the refracted beam in the liner 208 will have a smaller divergence angle. By modifying the shape and materials, various focusing can take place in this embodiment. Other embodiment may use multi-element transducer arrays and phased electrical excitation to achieve focusing.

Figure 7:
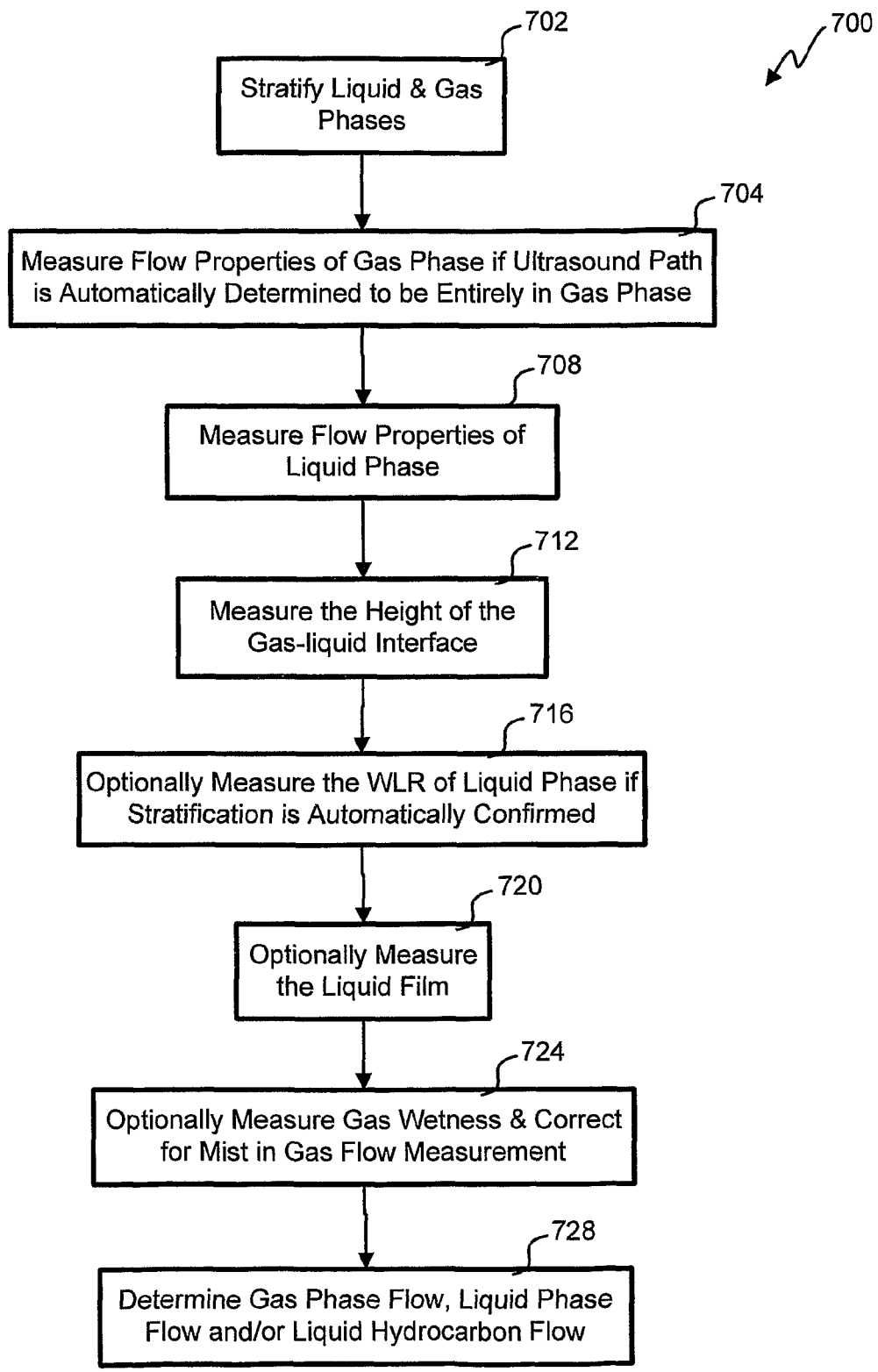
FIG. 7 illustrates a flowchart of an embodiment of a process for measuring multiphase flow of hydrocarbons within a pipeline.

Referring next to FIG. 7, a flowchart of an embodiment of a process 700 for measuring multiphase flow of hydrocarbons within a pipe 204 is shown. The depicted portion of the process begins in block 704 where the liquid and gas phases 240, 250 are stratified. A horizontal section of pipe 204 may be used to stratify the multiphase mixture flow. In certain aspects the length of the horizontal section may be determined to provide for the stratified flow and in other aspects a system, such as an expansion section having an internal diameter greater than the pipe or the like may be used to reduce the flow rate of the multiphase mixture and provide for producing stratified flow in the horizontal section of pipe 204. In certain aspects, the flowing multiphase mixture may be interrogated by ultrasonic sensors, microwave sensors, optical sensors and/or the like to determine whether the multiphase mixture is flowing in a stratified flow regime. For example, Doppler interrogation may be used to determine if and/or where in the pipe a liquid-gas boundary exists.

In block 704, the ultrasonic gas flowmeter 118 can measure the velocity of the gas phase 250. One or more of the transit-time ultrasonic transducers 116 may be submerged or otherwise fouled with liquid when operational in the field. If that is the case, the processor 110 notes the error condition and may take corrective action, but the gas phase 250 reading may not be able to be gathered. The ultrasonic pulsed Doppler probe(s) 120 can measure the flow velocity of the liquid phase 240 in block 708. Additionally, the ultrasonic pulsed Doppler probe(s) 120 can measure the height of the gas-liquid interface 230 in block 712 using reflections and/or register which probes 120 in a Doppler array 122 appear to not be submerged in the liquid phase.

Using EM transmitter 128 and receivers 124, block 716 allows determination of the WLR of the stratified liquid phase which is confirmed by measurements performed in the previous blocks.

In block 720, the liquid film 245 in the gas phase 250 is optionally measured using ultrasonic film measurement transducers 132. The gas wetness is measured in block 724 to determine if the gas flow measurement is likely to be accurate or if other algorithms should be used by the processor 110 to determine or estimate the gas flow. With the information gathered in the prior blocks, the gas phase flow rate, the liquid phase flow rate and/or the liquid hydrocarbon flow rate are determined in block 728 may be determined by the processor 110. That information may be relayed to other systems and/or displayed.

In aspects of the present invention, the following information can also be provided by the ultrasonic transit-time and range-gated Doppler systems:

- The extremely low values of Doppler energy cross-pipe profile is indicative of a single-phase gas flow or a single-phase liquid flow (often with marked velocity readings; there is often always impurities/scatters in oil-field water or oil flows).
- In the case of single-phase gas flow, ultrasonic transit-time gas flow meter 118 provides a velocity reading.
- The sound-velocity measurement from the transit-time gas meter 118 may also be exploited in some cases for liquid fraction indication (e.g., entrained liquid mist/droplet fraction in the carrying gas).
- The instantaneous velocity or energy readings of the pulsed Doppler system at selected pipe depth(s) may be exploited to indicate flow fluctuations related to flow-regime information (e.g. slug length/frequency); and
- Two Doppler probes may be installed axially apart at pipe underside and/or top-side to derive e.g. the slug velocity (which is closely related to gas velocity for slug flows) by cross-correlating their instantaneously sampled Doppler flow velocity or energy data.

A number of variations and modifications of the disclosed embodiments can also be used. For example, the various flowmeters, arrays, transducers, sensors, transmitters, and receivers can be combined in various ways for a given multiphase flow measurement system. Additionally, the number of sensors, probes and transducers can be different in various embodiments.

While the principles of the disclosure have been described above in connection with specific apparatuses and methods, it is to be clearly understood that this description is made only by way of example and not as limitation on the scope of the disclosure.

What is claimed is:

1. A method for measuring flow properties of a multiphase mixture comprising gas-liquid hydrocarbons and water flowing in a pipe, the method comprising:
   - conditioning the flow of the multiphase mixture in the pipe so that the flow of the multiphase mixture in the pipe comprises a stratified flow with a gas phase of the multiphase mixture flowing above a liquid phase of the multiphase mixture, wherein conditioning the flow of the multiphase flow mixture in the pipe comprises artificially stratifying the flow of the multiphase mixture in the pipe and wherein the multiphase mixture has a high gas volume fraction that is above 95%;
   - measuring a first transit time for a first ultrasonic signal to pass from a first transducer to a second transducer through the gas phase in an upstream direction across the pipe without the first ultrasonic signal reflecting from the liquid phase at a boundary between the liquid phase and the gas phase flowing above the liquid phase;
   - measuring a second transit time for a second ultrasonic signal to pass from the second transducer to the first transducer through the gas phase in a downstream direction across the pipe without the second ultrasonic signal reflecting from the liquid phase at the boundary between the liquid phase and the gas phase flowing above the liquid phase;
   - using the first and the second transit times to determine a velocity of the gas phase;
   - transmitting pulses of ultrasonic signals from a pulsed ultrasonic Doppler probe into the liquid phase of the multiphase mixture;
   - receiving, at the ultrasonic Doppler probe, reflections of the pulsed ultrasonic signals transmitted into the liquid phase;
   - using the reflections of the pulsed ultrasonic signals received by the ultrasonic Doppler probe to determine a liquid holdup;
   - using the reflections of the pulsed ultrasonic signals received by the ultrasonic Doppler probe to determine a liquid velocity;
   - calculating gas flow rate within the pipe using the liquid holdup and the velocity of the gas phase; and
   - calculating liquid flow rate within the pipe using the liquid holdup and the velocity of the liquid phase.

2. The method as recited in claim 1, further comprising:
   - determining a water to liquid ratio (WLR) of the liquid phase; and
   - calculating water and liquid hydrocarbon flow rates within the pipe using the liquid flow rate and the WLR.

3. The method as recited in claim 2, wherein determining the WLR comprises transmitting an electromagnetic (EM) signal through the liquid phase.

4. The method as recited in claim 3, wherein the transmitting uses an EM transmitter and an EM receiver that both operatively engage the pipe proximate to the liquid phase.

5. The method as recited in claim 1, further comprising: determining ultrasonically a wetness of the gas phase.

6. The method as recited in claim 1, further comprising: verifying that the multiphase mixture is stratified.

7. The method as recited in claim 1, wherein the pulsed ultrasonic signals are produced by a plurality of pulsed ultrasonic Doppler probes arranged in a Doppler array.

8. The method as recited in claim 7, further comprising: using the Doppler array to determine that the multiphase mixture is stratified.

9. The method as recited in claim 1, wherein determining the liquid holdup comprises determining a height of a gas-liquid interface using the reflections of the pulsed ultrasonic signals.

10. The method as recited in claim 1, wherein: the first and the second ultrasonic signals are generated by the first and second transducers, which each engage an upper half of the pipe above and including a horizontal plane aligned with the middle line of the pipe.

11. The method as recited in claim 1, wherein the pipe is arranged horizontally, and the method further comprises: ultrasonically measuring a liquid film at an upper half of the pipe above a horizontal plane aligned with the middle line of the pipe.

12. The method for measuring flow properties of the multiphase mixture comprising gas-liquid hydrocarbons and water flowing in the pipe of stratified flow as recited in claim 1, wherein:
   the pulsed ultrasonic signals are transmitted into a lower portion of the pipe below a horizontal plane aligned with the middle line of the pipe.

13. The method as recited in claim 1, further comprising: transmitting an ultrasonic signal across the pipe through the gas phase, wherein the ultrasonic signal is transmitted across the pipe perpendicular to the flow of the gas phase in the pipe; and using attenuation of the ultrasonic signal transmitted through the gas phase to determine a holdup of liquid mist in the gas phase.

14. A system for measuring flow properties of a multiphase mixture of gas-liquid hydrocarbons and water flowing through a horizontal pipe in an artificially stratified flow, the system comprising:
    an artificial flow conditioner for stratifying the multiphase mixture;
    an ultrasonic gas flow meter configured to operatively engage an upper half of the pipe above and including a horizontal plane aligned with the middle line of the pipe and to measure a velocity of a gas phase in the pipe using transit times of ultrasonic signals passing across the pipe in an upstream and a downstream direction, wherein the ultrasonic gas flow meter comprises a pair of transit-time ultrasonic transducers positioned opposite one another to enable transmission and receipt of the ultrasonic signals passing across the pipe in the upstream and downstream directions from one side of the pipe to the other without the ultrasonic signals reflecting from a boundary between the gas phase and the liquid phase of the multiphase mixture;
    a pulsed ultrasonic Doppler probe configured to operatively engage with a lower half of the pipe below the horizontal plane aligned with the middle line of the pipe and configured to measure a velocity of a liquid phase in the pipe and a thickness of the liquid phase in the pipe; and
    a processor configured to:
        determine a gas and a liquid holdup,
        calculate gas flow rate within the pipe using the velocity of the gas phase, as measured with the ultrasonic gas flow meter, and the gas holdup, and
        calculate liquid flow rate within the pipe using the velocity of the liquid phase, as measured with the pulsed ultrasonic Doppler probe, and the liquid holdup;
    wherein the system enables measurement of the flow properties of the multiphase mixture having a gas volume fraction greater than 95%.

15. The system as recited in claim 14, wherein the processor is further configured to:
    determine a WLR of the liquid phase, and
    calculate liquid hydrocarbon and water flow rates within the pipe using the liquid flow rate and the WLR.

16. The system as recited in claim 14, the system further comprising an EM transmitter and an EM receiver that both operatively engage the pipe proximate to the liquid phase.

17. The system as recited in claim 16, wherein the EM transmitter and the EM receiver are used to measure WLR and water salinity.

18. The system as recited in claim 14, wherein the pulsed ultrasonic Doppler probe is one of a plurality of pulsed ultrasonic Doppler probes arranged in a Doppler array.

19. The system as recited in claim 14, wherein the pulsed ultrasonic Doppler probe comprises a transducer suitable for range-gated pulsed Doppler measurement.

* * * * *